(12) United States Patent
Kim et al.

(10) Patent No.: US 11,310,781 B2
(45) Date of Patent: *Apr. 19, 2022

(54) METHOD AND APPARATUS FOR ALLOCATING RESOURCE IN WIRELESS COMMUNICATION SYSTEM

(71) Applicant: LG ELECTRONICS INC., Seoul (KR)

(72) Inventors: Myoungseob Kim, Seoul (KR); Suckchel Yang, Seoul (KR); Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,119

(22) Filed: Jul. 30, 2020

(65) Prior Publication Data

US 2020/0359373 A1 Nov. 12, 2020

Related U.S. Application Data

(63) Continuation of application No. 15/541,221, filed as application No. PCT/KR2015/014570 on Dec. 31, 2015, now Pat. No. 10,772,083.

(Continued)

(51) Int. Cl.
*H04W 72/04* (2009.01)
*H04L 1/00* (2006.01)
(Continued)

(52) U.S. Cl.
CPC ...... *H04W 72/0413* (2013.01); *H04B 7/0636* (2013.01); *H04L 1/0057* (2013.01);
(Continued)

(58) Field of Classification Search
CPC ....... H04L 1/18; H04L 1/1812; H04L 1/1822; H04L 1/1825; H04L 1/1854;
(Continued)

(56) References Cited

U.S. PATENT DOCUMENTS

2010/0074208 A1 3/2010 Farajdana et al.
2011/0081932 A1 4/2011 Astely et al.
(Continued)

FOREIGN PATENT DOCUMENTS

WO WO 2013/051983 A1 4/2013
WO WO 2013/162247 A1 10/2013
(Continued)

*Primary Examiner* — Pao Sinkantarakorn
*Assistant Examiner* — Pawaris Sinkatarakorn
(74) *Attorney, Agent, or Firm* — Birch, Stewart, Kolasch & Birch, LLP

(57) ABSTRACT

A method of transmitting, by a user equipment (UE), uplink control information (UCI) in a wireless communication system includes receiving, from a base station (BS), physical uplink control channel (PUCCH) resource information for the UCI. Further, the UCI is hybrid automatic repeat request (HARQ) feedback information of multiple downlink cells. The method also includes transmitting, to the BS, the UCI on a PUCCH resource. In addition, the PUCCH resource is mapped to multiple resource block (RB) pairs, the multiple RB pairs include RBs included in a first slot and RBs included in a second slot, the RBs included in the first slot are consecutive RBs to each other, and the RBs included in the second slot are consecutive RBs to each other.

17 Claims, 16 Drawing Sheets

(a) Symmetric (a) Sequential

▨ RB pair#1
▧ RB pair#2
▩ RB pair#2

Related U.S. Application Data

(60) Provisional application No. 62/133,476, filed on Mar. 16, 2015, provisional application No. 62/103,022, filed on Jan. 13, 2015, provisional application No. 62/098,346, filed on Dec. 31, 2014.

(51) Int. Cl.
| | | |
|---|---|---|
| *H04L 1/18* | (2006.01) | |
| *H04L 5/00* | (2006.01) | |
| *H04B 7/06* | (2006.01) | |
| *H04W 52/32* | (2009.01) | |
| *H04W 72/12* | (2009.01) | |
| *H04W 88/08* | (2009.01) | |

(52) U.S. Cl.
CPC .......... *H04L 1/0071* (2013.01); *H04L 1/1854* (2013.01); *H04L 1/1896* (2013.01); *H04L 5/00* (2013.01); *H04L 5/0048* (2013.01); *H04W 52/32* (2013.01); *H04W 72/0406* (2013.01); *H04W 72/0446* (2013.01); *H04W 72/12* (2013.01); *H04L 5/0055* (2013.01); *H04L 5/0057* (2013.01); *H04W 88/08* (2013.01)

(58) Field of Classification Search
CPC ... H04L 1/1861; H04L 1/1864; H04L 5/0035; H04L 5/0055; H04W 72/04–042; H04W 72/0446; H04W 72/0453; H04W 72/1268; H04W 72/1289

See application file for complete search history.

(56) References Cited

U.S. PATENT DOCUMENTS

| | | |
|---|---|---|
| 2013/0142161 A1 | 6/2013 | Lee et al. |
| 2013/0301600 A1 | 11/2013 | Park |
| 2014/0126491 A1 | 5/2014 | Ekpenyong et al. |
| 2014/0348085 A1 | 11/2014 | Wang et al. |
| 2015/0029990 A1 | 1/2015 | Marinier et al. |
| 2015/0131565 A1* | 5/2015 | Nakashima ........... H04L 1/0026 370/329 |
| 2016/0127106 A1* | 5/2016 | Nogami ................ H04L 5/0053 370/329 |
| 2016/0211959 A1 | 7/2016 | Jöngren et al. |
| 2016/0249345 A1 | 8/2016 | Takeda et al. |
| 2017/0295005 A1* | 10/2017 | Lee ....................... H04W 48/12 |

FOREIGN PATENT DOCUMENTS

| | | |
|---|---|---|
| WO | WO 2014/038852 A1 | 3/2014 |
| WO | WO 2014/084566 A1 | 6/2014 |
| WO | WO 2014/142578 A1 | 9/2014 |

\* cited by examiner

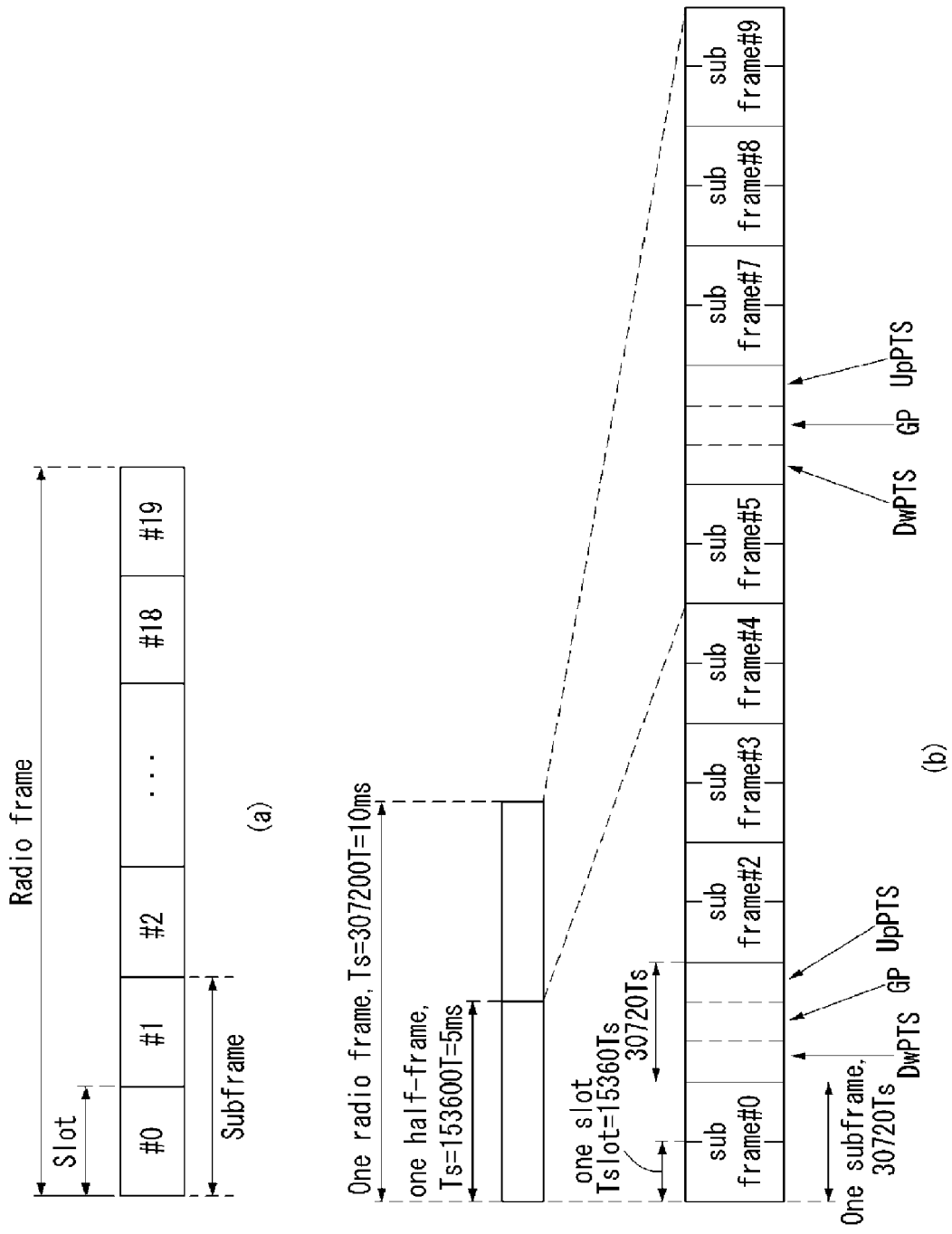

[Figure 2]
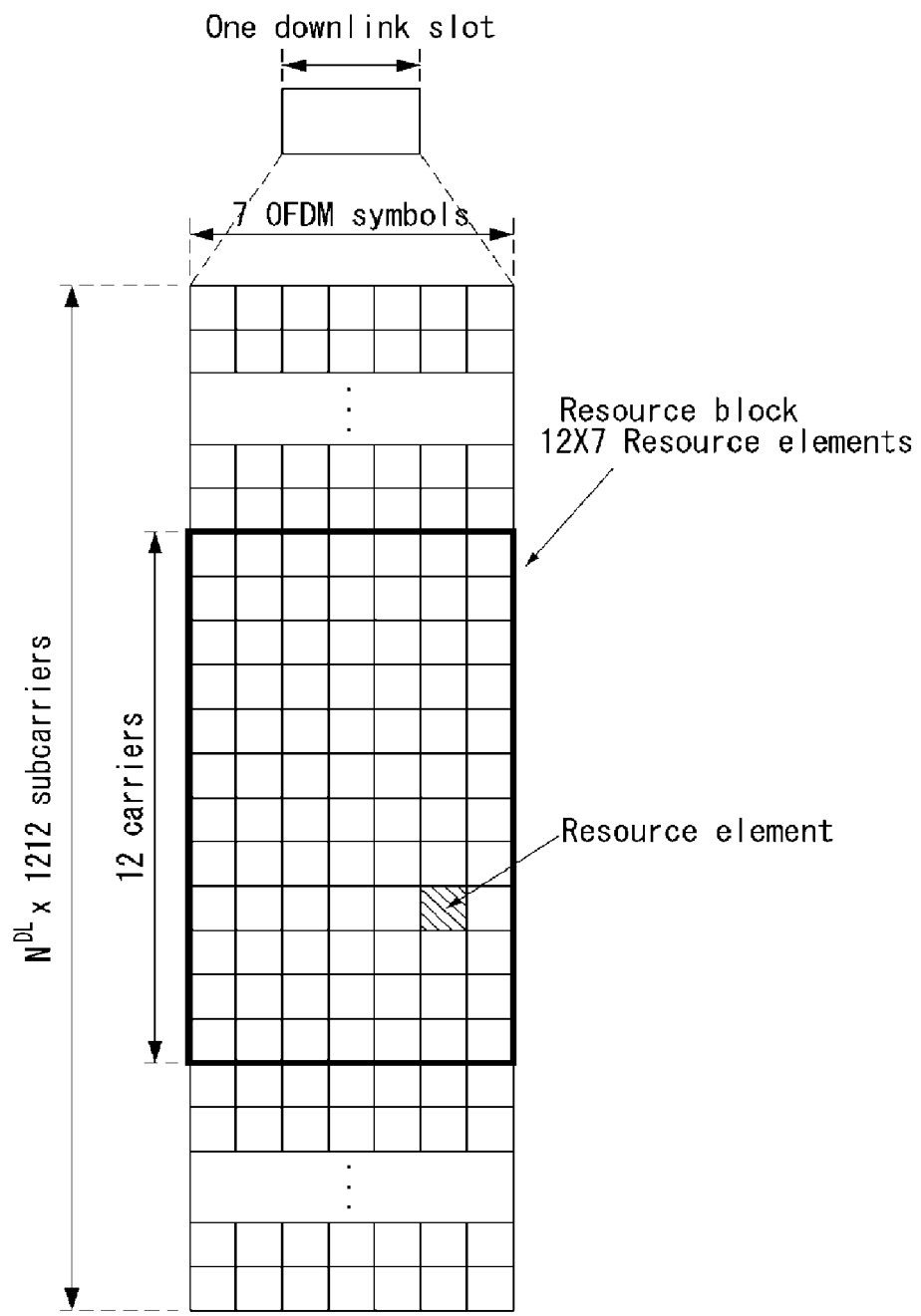

[Figure 3]
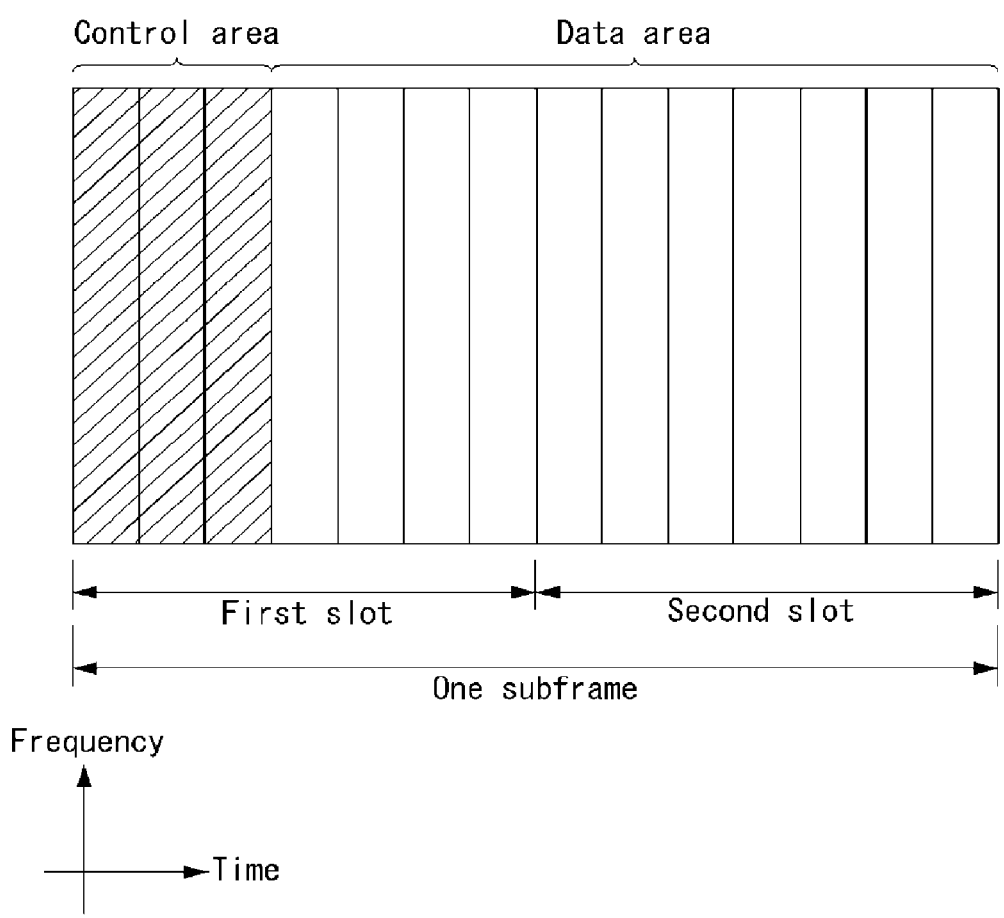

[Figure 4]
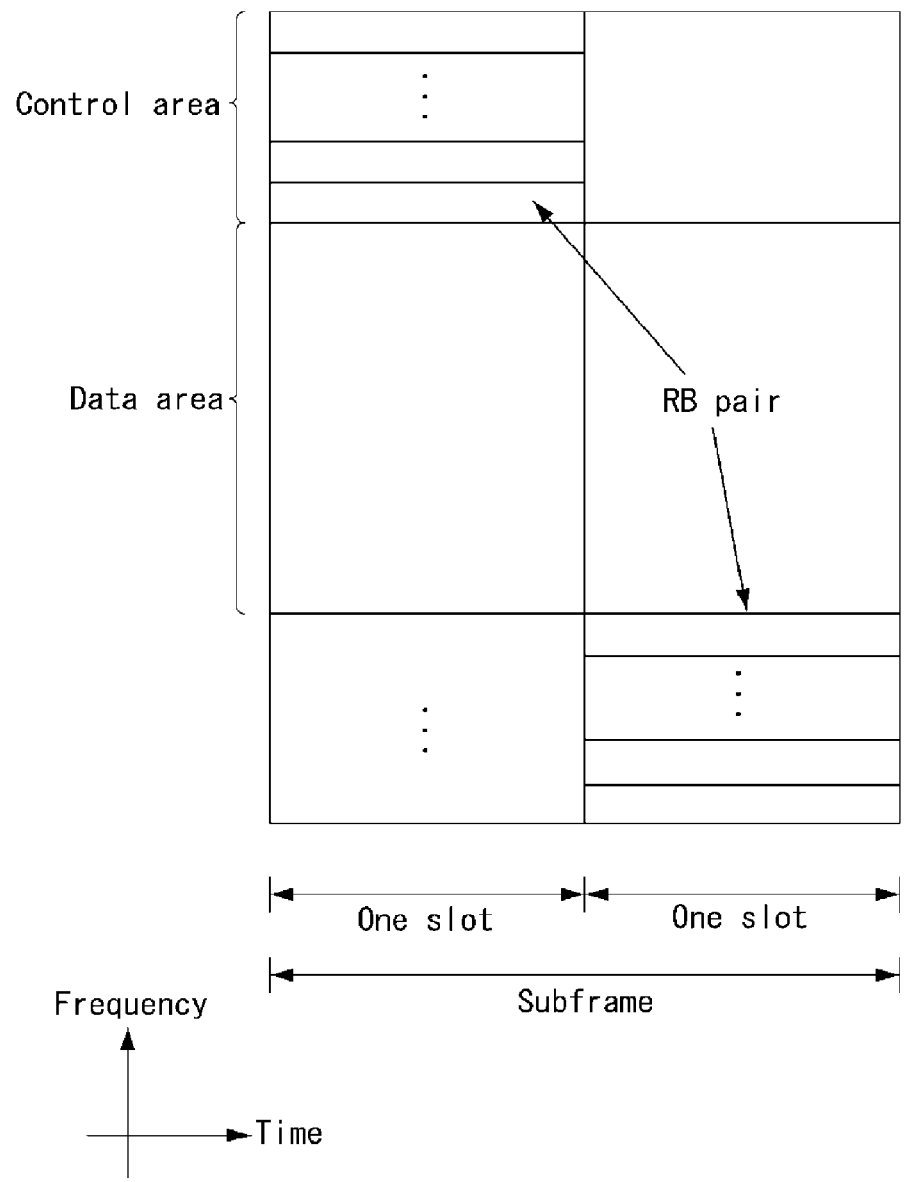

[Figure 5]
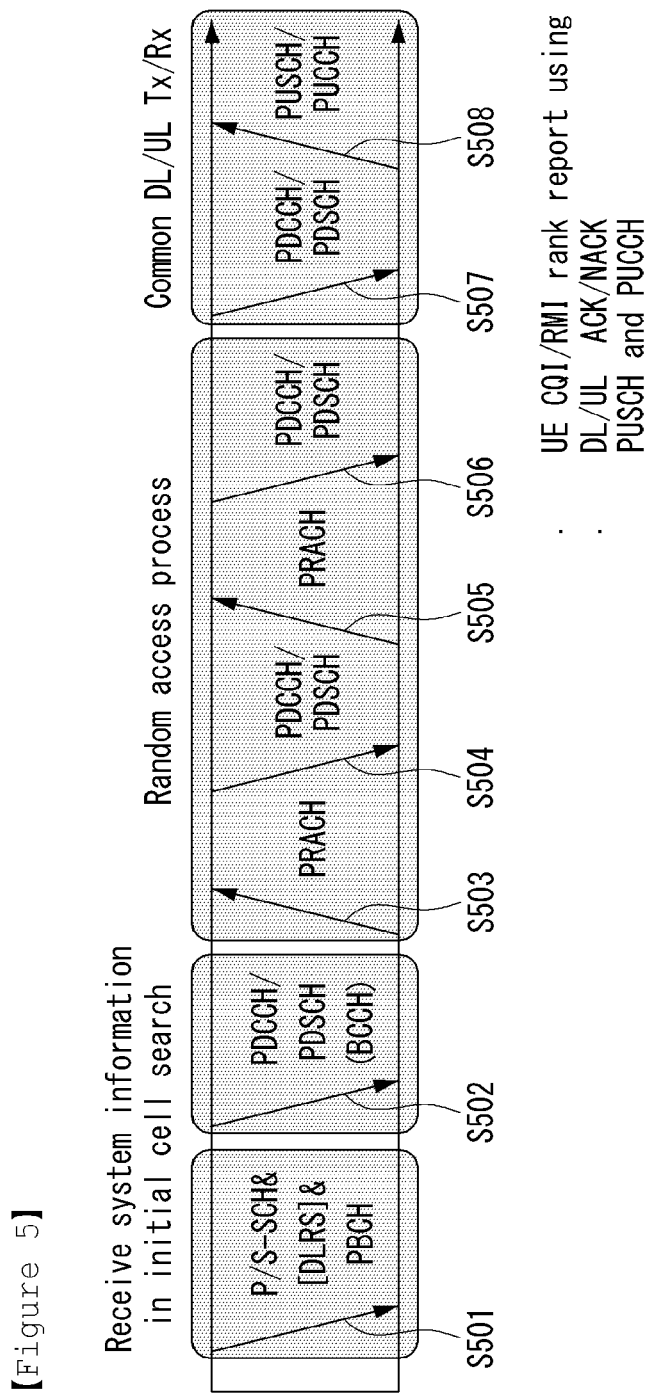

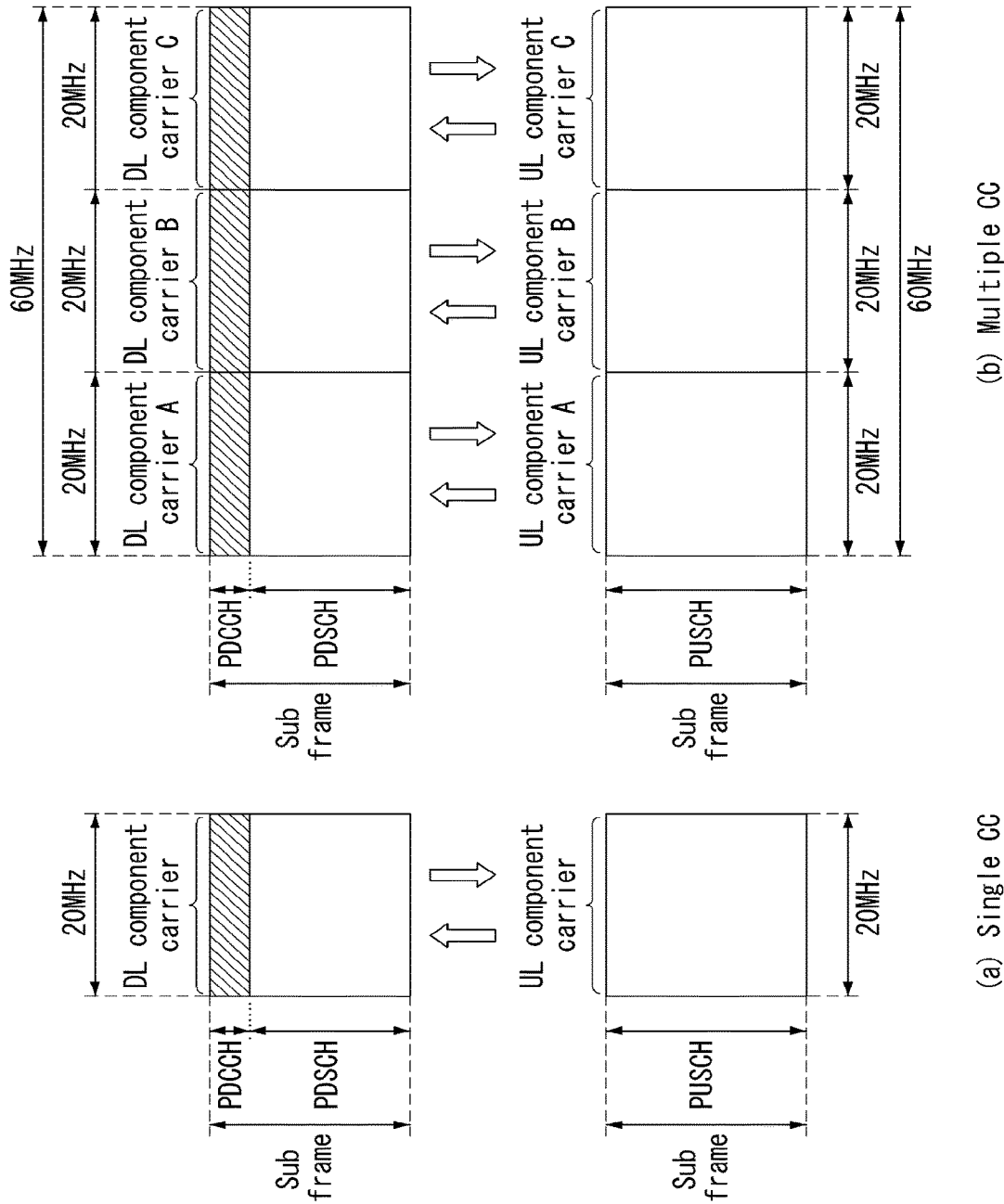
[Figure 6]

[Figure 7]
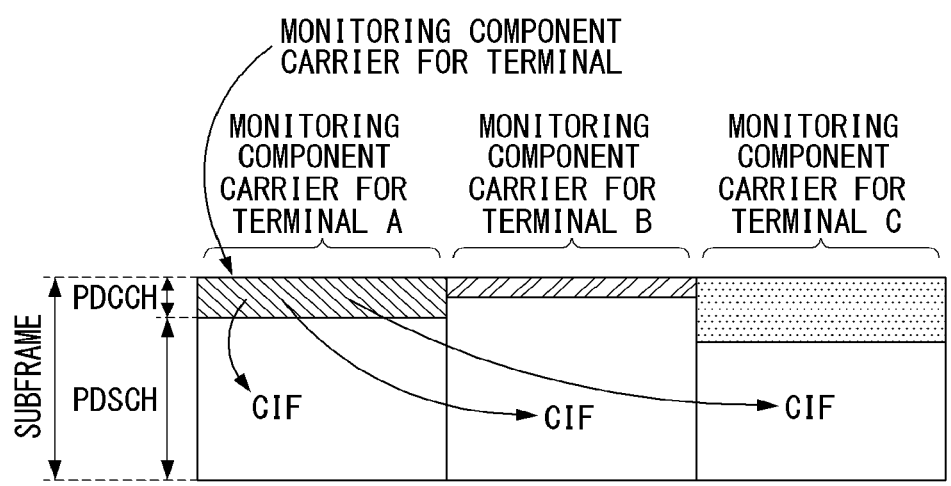

[Figure 8]
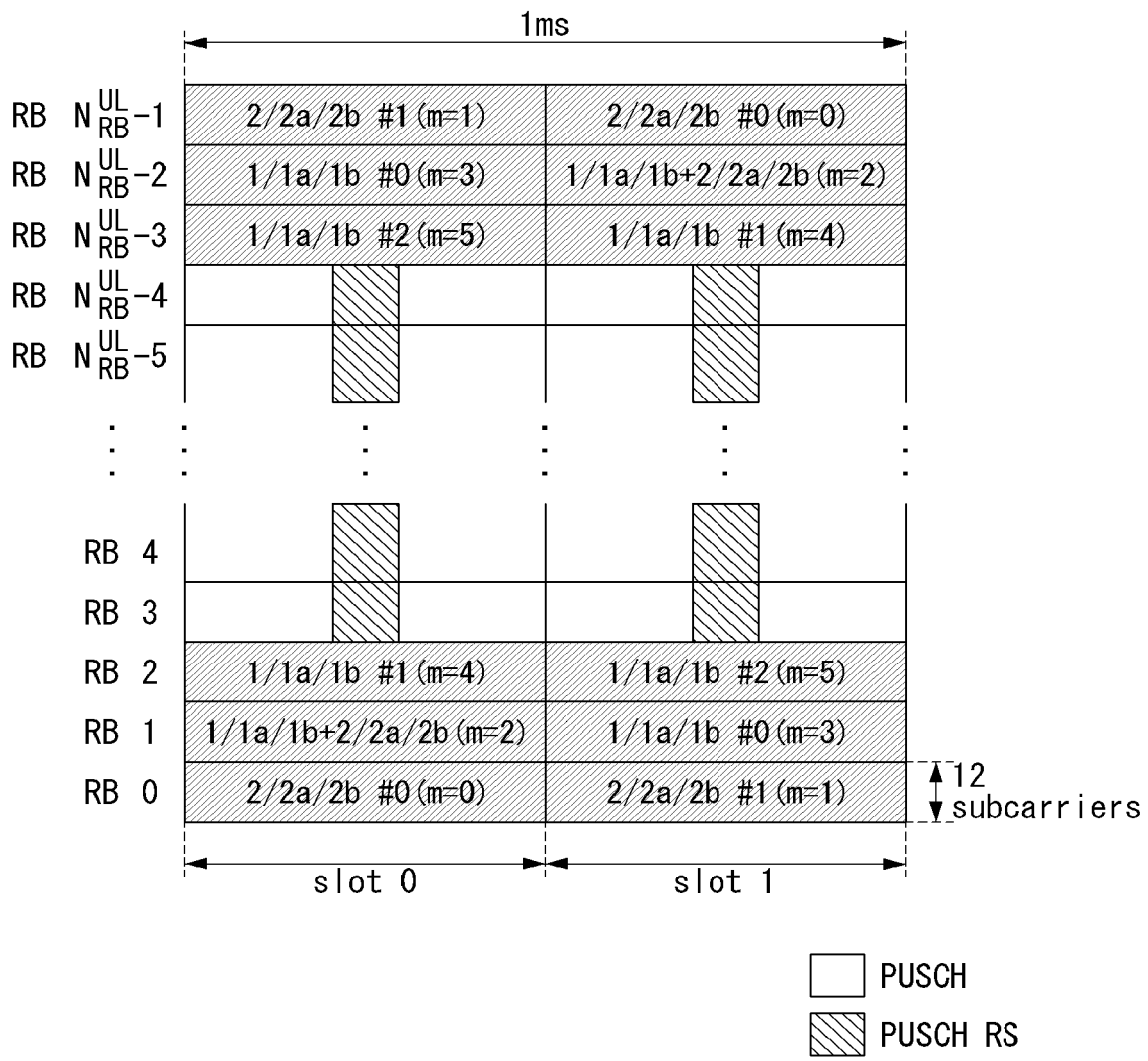

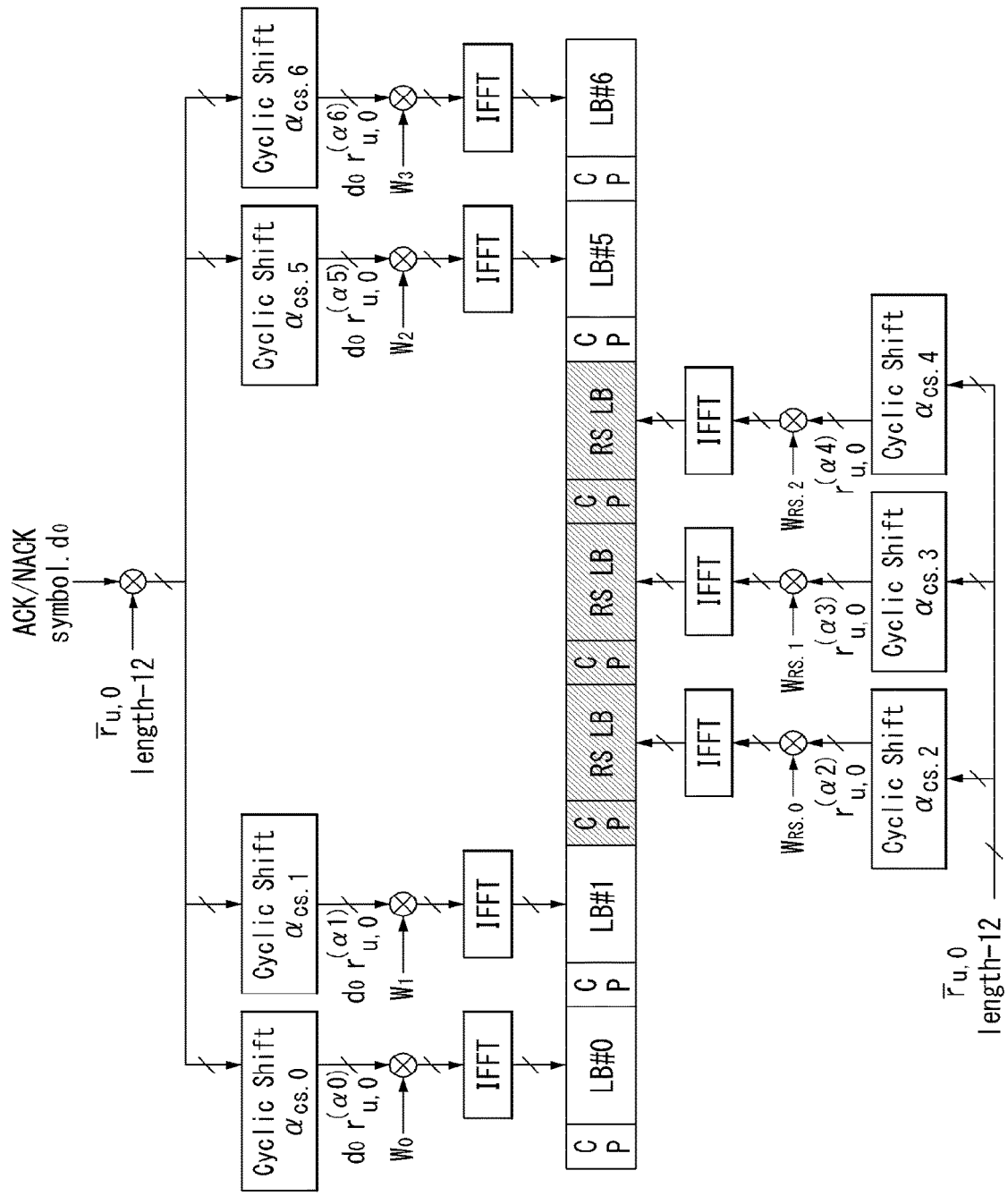
[Figure 9]

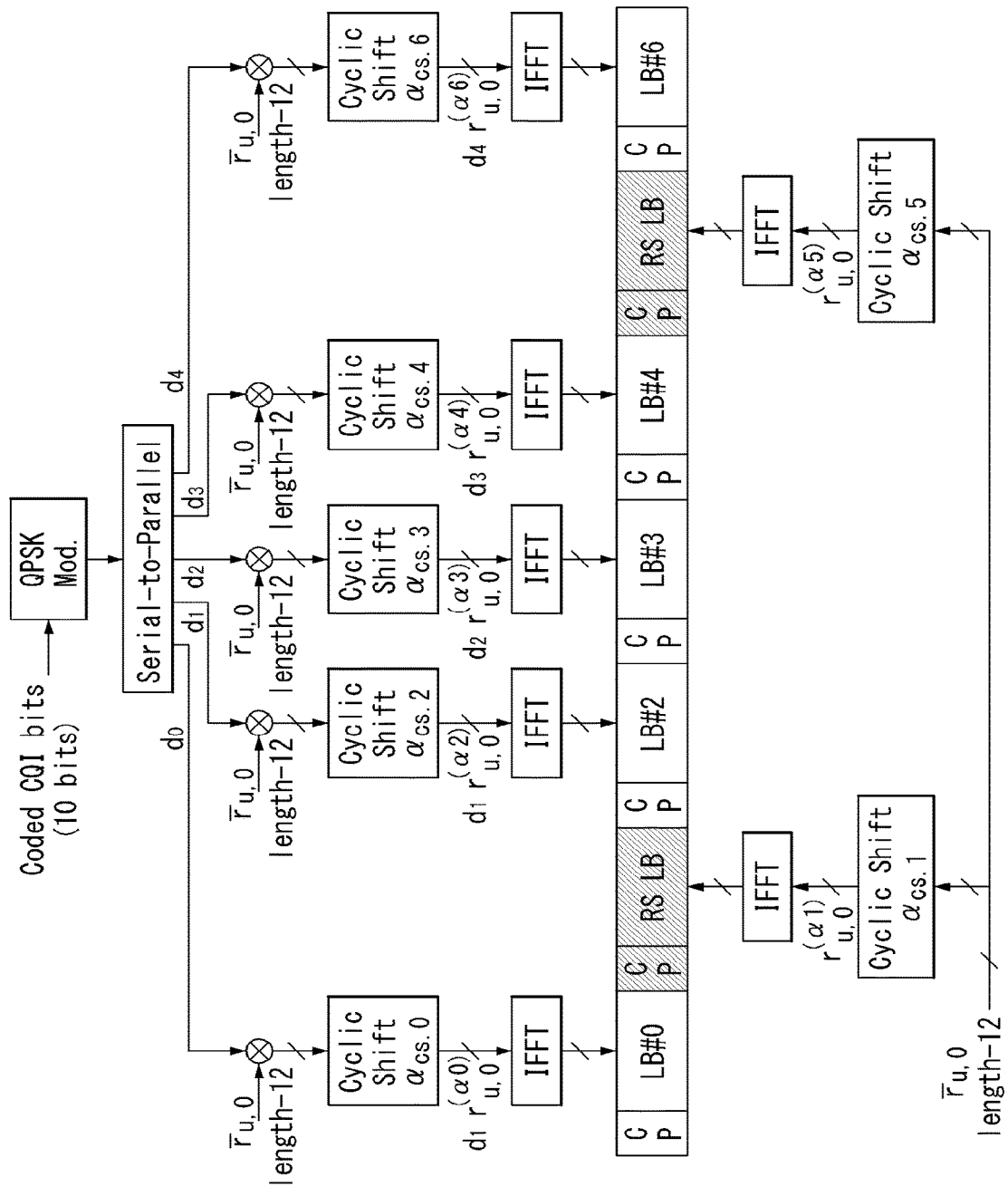
[Figure 10]

【Figure 11】
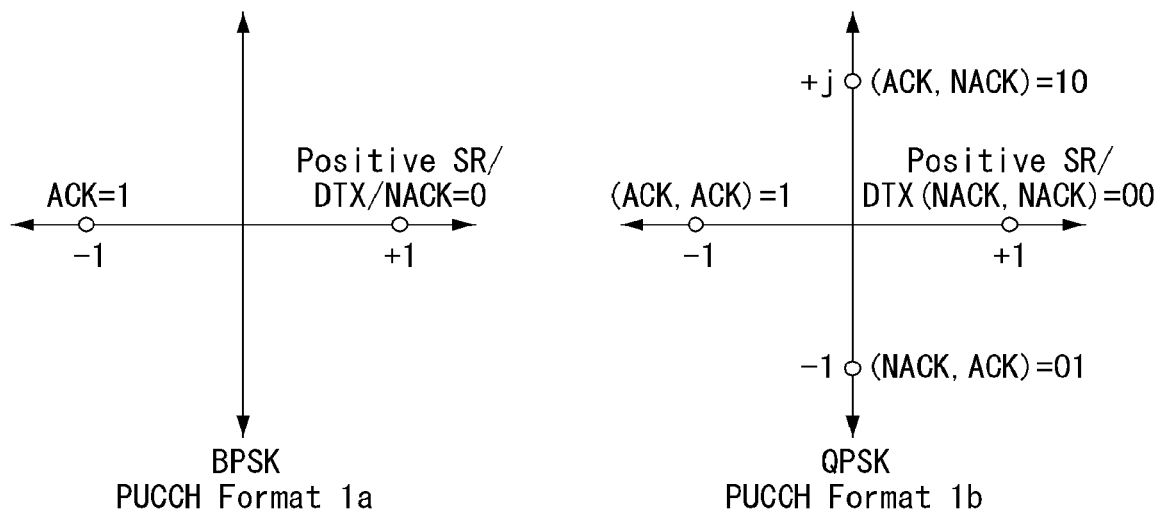
【Figure 12】
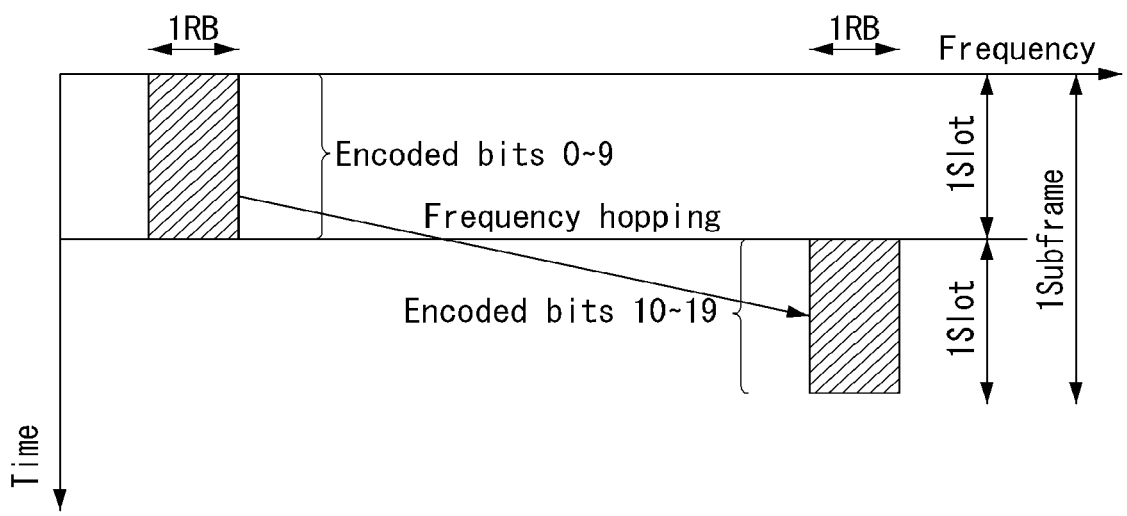

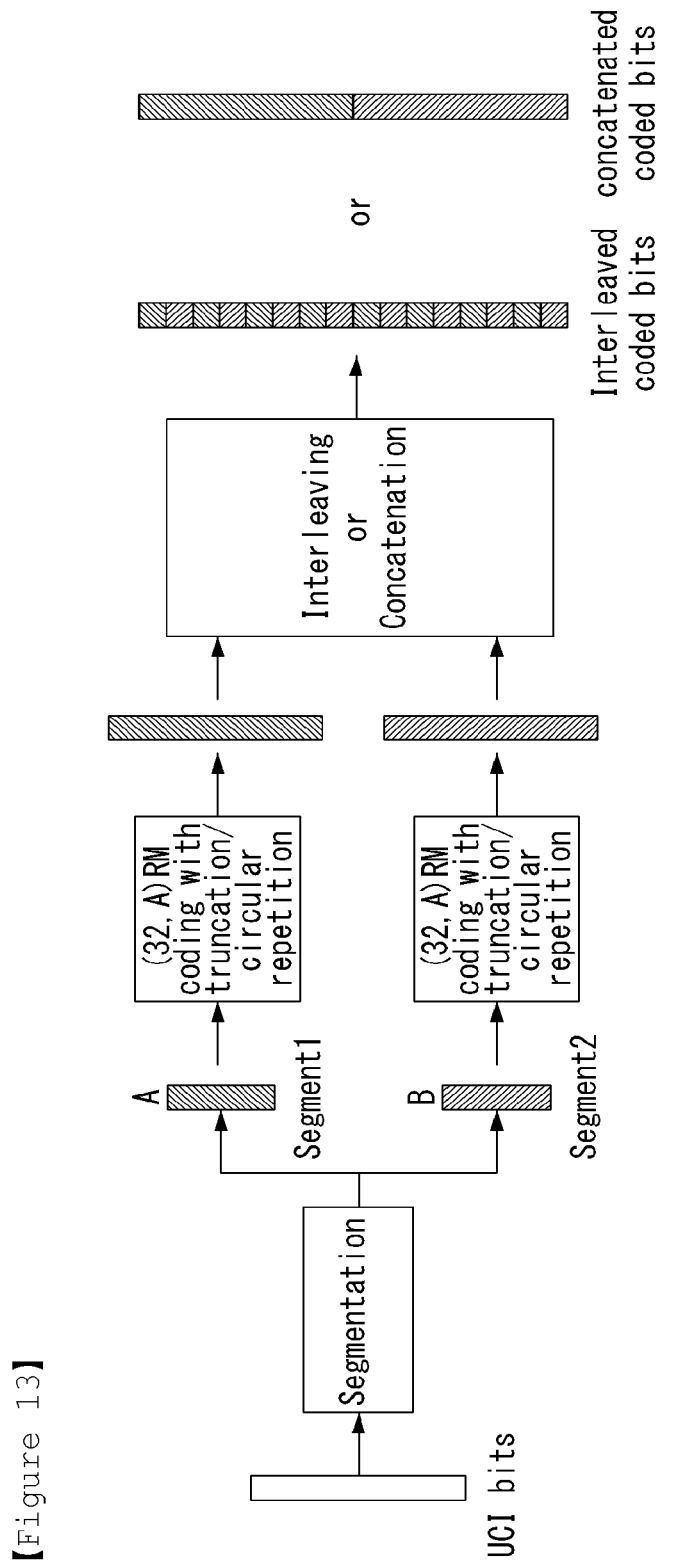
[Figure 13]

【Figure 14】
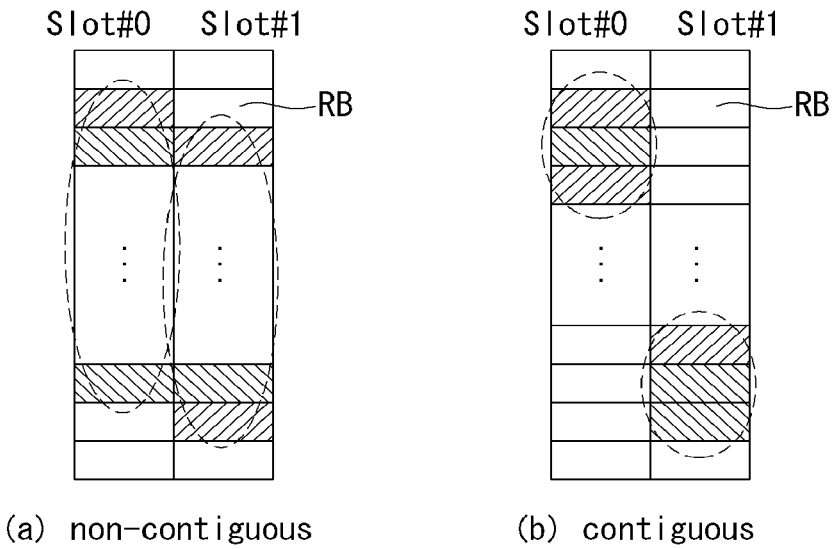
(a) non-contiguous  (b) contiguous
【Figure 15】
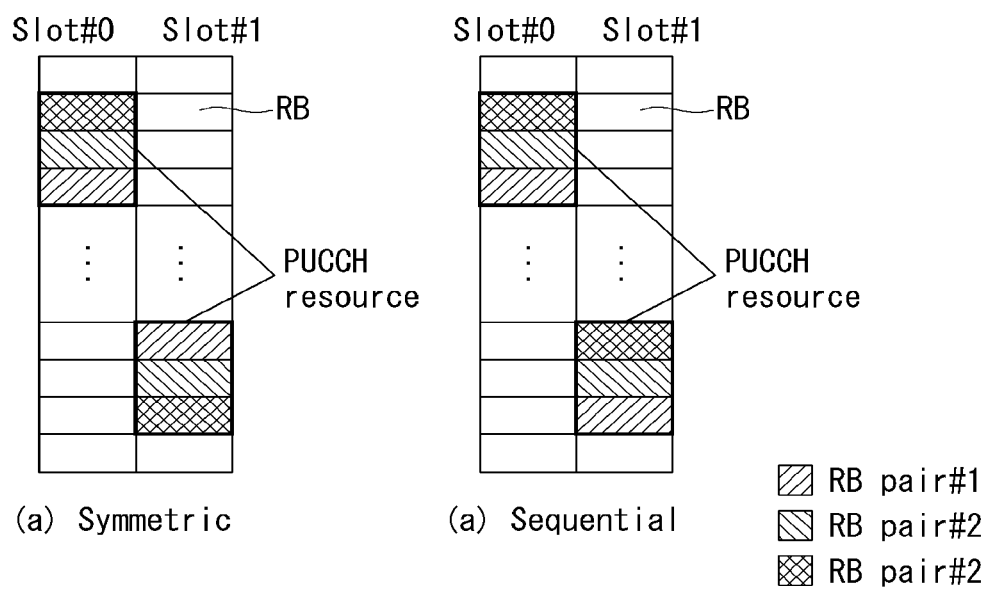
(a) Symmetric  (a) Sequential

[Figure 16]
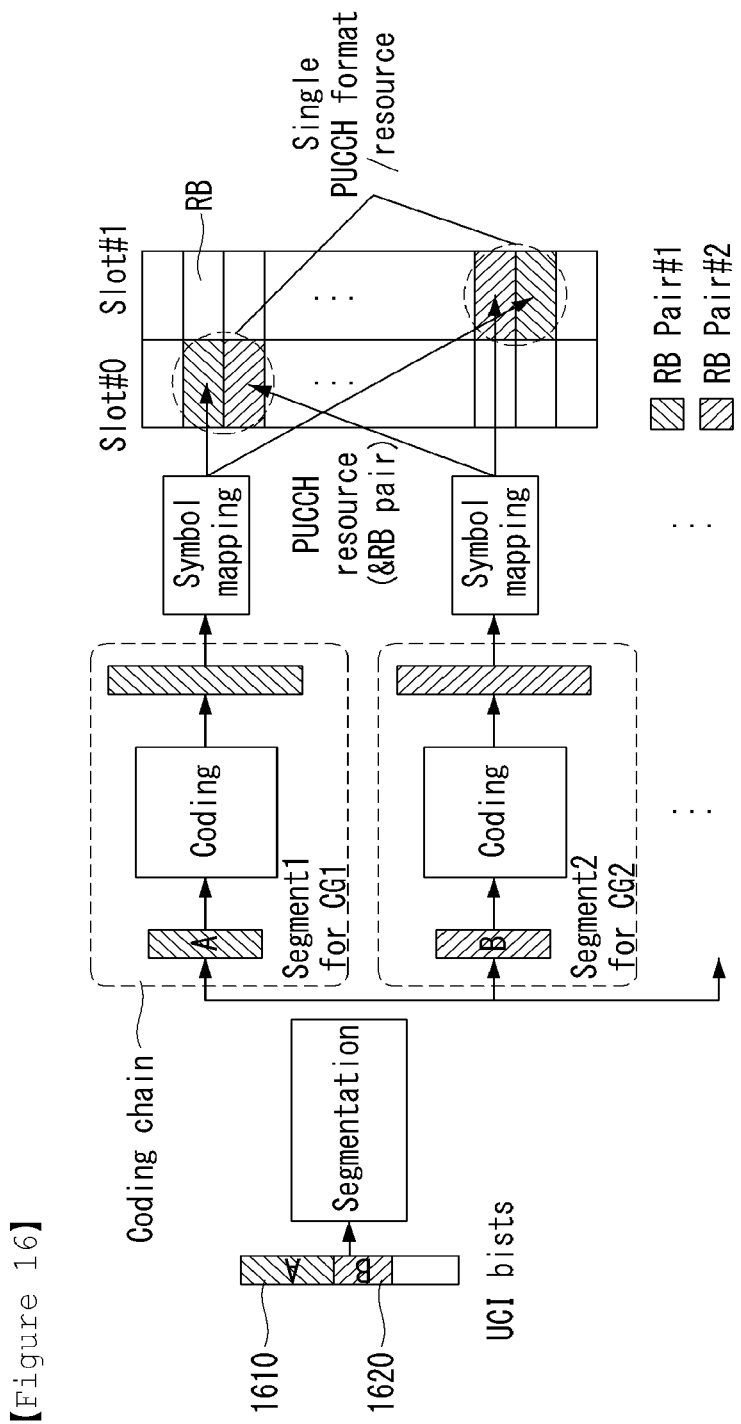

【Figure 17】
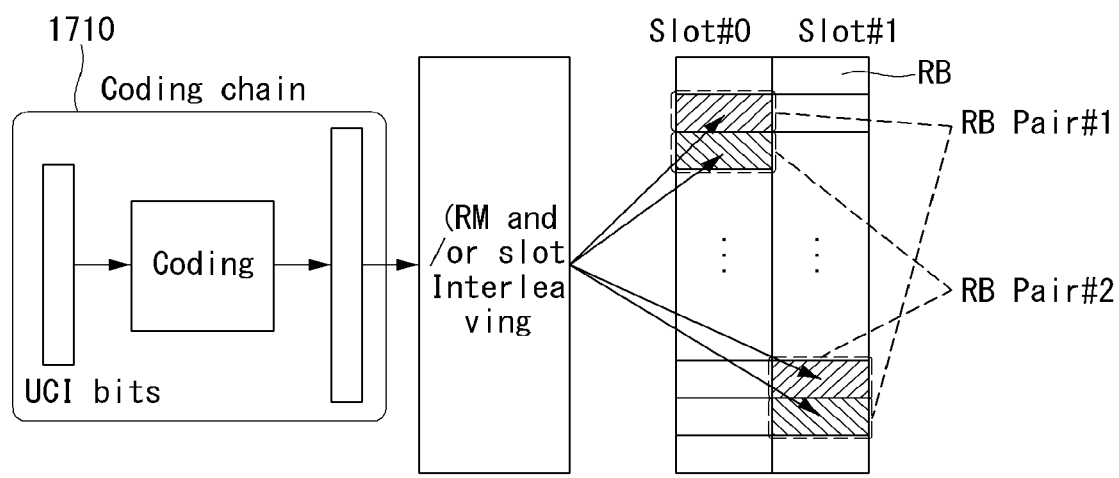

【Figure 18】
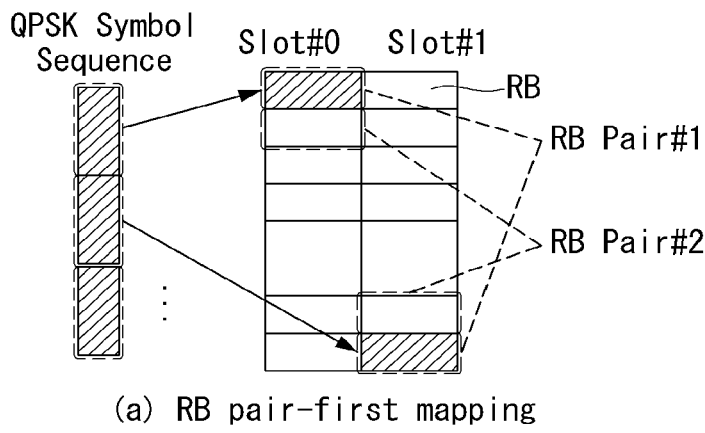
(a) RB pair-first mapping
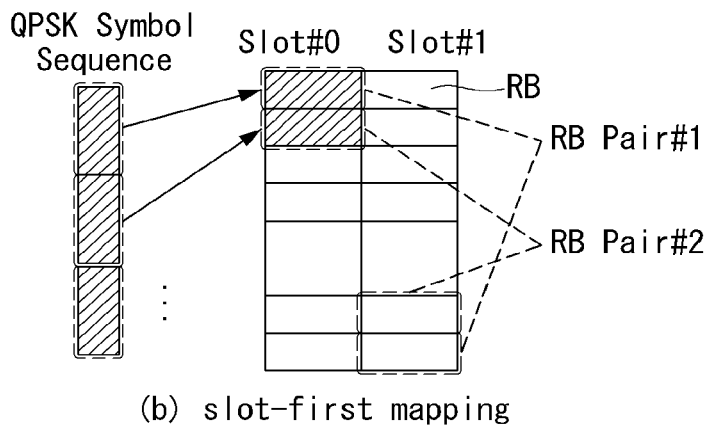
(b) slot-first mapping
【Figure 19】
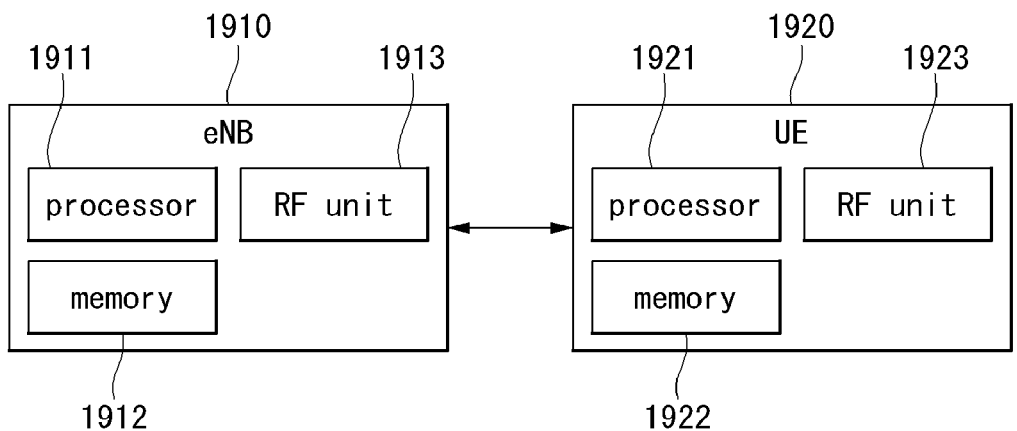

METHOD AND APPARATUS FOR ALLOCATING RESOURCE IN WIRELESS COMMUNICATION SYSTEM

CROSS-REFERENCE TO RELATED APPLICATIONS

This Application is a Continuation of U.S. patent application Ser. No. 15/541,221 filed on Jun. 30, 2017 (now U.S. Pat. No. 10,772,083 issued on Sep. 8, 2020), which is the National Phase of PCT International Application No. PCT/KR2015/014570 filed on Dec. 31, 2015, which claims the priority benefit under 35 U.S.C. § 119(e) to U.S. Provisional Application Nos. 62/133,476 filed on Mar. 16, 2015, 62/103,022 filed on Jan. 13, 2015 and 62/098,346 filed on Dec. 31, 2014, all of which are hereby expressly incorporated by reference into the present application.

BACKGROUND OF THE INVENTION

Field of the Invention

The present invention relates to a wireless communication system and, more particularly, to a method for allocating resource and an apparatus therefor.

Discussion of the Related Art

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

SUMMARY OF THE INVENTION

An aspect of the present invention provides a method for defining a PUCCH format for supporting HARQ ACK/NACK regarding a PDSCH of a plurality of carrier components (CCs) in a CA enhancement (massive CA or enhanced CA) system in which a plurality of CCs are used and transmitting HARQ ACK/NACK through the defined PUCCH format.

Another aspect of the present invention provides a method for identifying a plurality of pieces of uplink control information (UCI) allocated to an uplink resource region for transmission of UCI.

Technical subjects obtainable from the present invention are non-limited by the above-mentioned technical task. And, other unmentioned technical tasks can be clearly understood from the following description by those having ordinary skill in the technical field to which the present invention pertains.

According to an aspect of the present invention, a method for allocating resource by a base station (BS) in a wireless communication system includes: allocating an uplink resource region for transmission of uplink control information (UCI) of a user equipment (UE) to the UE, the UCI being information related to multiple downlink cells; and receiving the UCI from the UE through the allocated uplink resource region on at least one uplink cell, wherein the uplink resource region includes one physical uplink control channel (PUCCH) resource, the one PUCCH resource is mapped to multiple resource block (RB) pairs, and the multiple RB pairs are mapped as contiguous RBs in each slot.

Also, in the present disclosure, a long demodulation reference signal (DMRS) sequence generated for the entirety of the multiple resource block pairs or the entirety of specific resource block pairs may be used in the one PUCCH resource.

Also, in the present disclosure, the same orthogonal cover code (OCC) index may be used in each of the multiple resource block pairs.

Also, in the present disclosure, the method may further include: transmitting control information related to determination of a PUCCH resource included in the uplink resource region to the UE, wherein the control information may include at least one of candidate list information of the PUCCH resource or an acknowledgement resource indicator (ARI) field indicating a specific PUCCH resource for transmitting the UCI among candidates of PUCCH resource.

Also, in the present disclosure, the ARI field may be set to be the same for every cell group.

Also, in the present disclosure, the method may further include: transmitting downlink control information (DCI) including a transmit power control (TPC) command of the one PUCCH resource to the UE through a specific cell among the multiple downlink cells.

Also, in the present disclosure, the allocating of an uplink resource region may include: allocating multiple UCIs having different PUCCH formats to the uplink resource region; and multiplexing the multiple UCIs in a data symbol of the uplink resource region using different orthogonal cover code (OCC) indices.

Also, in the present disclosure, the method may further include: multiplexing the multiple UCIs using at least one of different cyclic shift (CS) values or different OCC indices in a demodulation reference signal (DMRS) symbol of the uplink resource region.

Also, in the present disclosure, the multiplexing of multiple UCIs may be performed when all or some of uplink resource regions to which each of the multiple UCIs is allocated overlap.

Also, in the present disclosure, the multiple downlink cells may include multiple cell groups (CGs), and Reed-Muller (RM) coding may be separately performed on the UCIs by cell groups or may be collectively performed on the entire cell groups.

Also, in the present disclosure, when the UCIs are separately coded by cell groups, single RM coding or dual RM coding may be performed depending on the number of bits of the UCIs divided by cell groups.

Also, in the present disclosure, when the UCIs are separately RM-coded and output by cell groups, RM interleaving may not be performed on coded bits of the output UCIs.

Also, in the present disclosure, when there is no scheduling of UCI transmission regarding a specific cell group among the multiple cell groups, UCI transmission regarding the specific cell group without scheduling may be dropped.

Also, in the present disclosure, when single coding is performed on the entire UCIs, the UCIs may be divided to correspond to the number of PUCCH resources allocated to the UE.

Also, in the present disclosure, single RM coding or dual RM coding may be performed on each of the divided UCIs in consideration of the number of bits of each of the divided UCIs.

Also, in the present disclosure, RM interleaving may be performed on coded bits of each UCI output through the RM coding.

Also, in the present disclosure, in the RB pair mapping of the RM-interleaved UCIs, the UCIs may be first mapped to a specific RB of a first slot and subsequently mapped to an RB in a pair relationship with the specific RB.

Also, in the present disclosure, in the RB pair mapping of the RM-interleaved UCIs, after mapping of the UCIs to RBs of a first slot is finished, the UCIs may be mapped to RBs of a second slot.

According to another aspect of the present invention, a method for allocating resource by a user equipment (UE) in a wireless communication system includes: receiving an allocated uplink resource region for transmission of uplink control information (UCI) from a base station (BS), the UCI being related to multiple downlink cells; and transmitting the UCI to the BS through the allocated uplink resource region on at least one uplink cell, wherein the uplink resource region includes one physical uplink control channel (PUCCH) resource, the one PUCCH resource is mapped to multiple resource block (RB) pairs, and the multiple RB pairs are mapped to contiguous RBs in each slot.

According to another aspect of the present invention, a user equipment (UE) for receiving allocated resource in a wireless communication system includes: a radio frequency (RF) unit transmitting and receiving a radio signal; and a processor functionally connected to the RF unit, wherein the processor performs control to receive an allocated uplink resource region for transmission of uplink control information (UCI) from a base station (BS), the UCI being related to multiple downlink cells, and transmit the UCI to the BS through the allocated uplink resource region on at least one uplink cell, wherein the uplink resource region includes one physical uplink control channel (PUCCH) resource, the one PUCCH resource is mapped to multiple resource block (RB) pairs, and the multiple RB pairs are mapped to contiguous RBs in each slot.

Advantageous Effects

In the present disclosure, even in cases where a size of a UCI (regarding HARQ-ACK) is increased in a CA enhancement (massive CA or enhanced CA) system in which a plurality of carrier components (CCs) are used, feedback of HARQ ACK/NACK may be effectively transmitted by utilizing multiple PUCCH resources.

Also, in the present disclosure, a plurality of UCIs may be transmitted and received through the same uplink resource area by multiplexing a plurality of UCIs using an OCC index, a DMRS CS, and the like.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 is a view illustrating a structure a radio frame in a wireless communication system to which the present invention can be applied.

FIG. 2 is a view illustrating a resource grid for one downlink slot in a wireless communication system to which the present invention can be applied.

FIG. 3 a view illustrating a structure of a downlink subframe in a wireless communication system to which the present invention can be applied.

FIG. 4 a view illustrating a structure of an uplink subframe in a wireless communication system to which the present invention can be applied.

FIG. 5 a view illustrating physical channels used for the 3GPP LTE/LTE-A system to which the present invention can be applied and a general signal transmission method using the physical channels.

FIG. 6 a view illustrating examples of a component carrier and carrier aggregation in a wireless communication system to which the present invention can be applied.

FIG. 7 a view illustrating a subframe structure depending on cross carrier scheduling in a wireless communication system to which the present invention can be applied.

FIG. 8 is a view illustrating an example in which PUCCH formats are mapped to PUCCH regions of uplink physical resource blocks in a wireless communication system to which the present invention can be applied.

FIG. 9 is a view illustrating a structure of an ACK/NACK channel in the case of a general CP in a wireless communication system to which the present invention can be applied.

FIG. 10 is a view illustrating a structure of a CQI channel in the case of a general CP in a wireless communication system to which the present invention can be applied.

FIG. 11 is a view illustrating a method for multiplexing ACK/NACK and SR in a wireless communication system to which the present invention can be applied.

FIG. 12 is a view illustrating an example in which encoded bits are mapped to resource.

FIG. 13 is a view illustrating an example of a dual-RM coding method.

FIGS. 14 and 15 are views illustrating an example of a method of mapping PUCCH resources to RBs, proposed in this disclosure.

FIG. 16 is a view illustrating an example of a method of individually performing ACK/NACK coding by cell groups and allocating the same to each RB pair, proposed in this disclosure.

FIG. 17 is a view illustrating an example of performing ACK/NACK coding on the entire cell groups and allocating the same to a plurality of RB pairs, proposed in this disclosure.

FIG. 18 is a view illustrating an example of performing intra-PUCCH interleaving, proposed in this disclosure.

FIG. 19 is a block diagram illustrating a wireless communication device to which methods proposed in this disclosure can be applied.

DETAILED DESCRIPTION OF THE EMBODIMENTS

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3$^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in abase station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S504. In the case of contention-based random access, the UE may carry out a contention resolution procedure including transmission of an additional PRACH signal S505 and reception of a PDCCH signal and the PDSCH signal corresponding to the PDCCH signal S506.

Afterwards, the UE which has carried out the procedure above may carry out reception S307 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

PDCCH (Physical Downlink Control Channel

Control information transmitted through a PDCCH is called downlink control indicator (DCI). A magnitude and a purpose of control information transmitted through the PDCCH may be varied depending on a DCI format, and a magnitude thereof may also be varied depending on a coding rate.

Table 2 shows DCIs in accordance with DCI formats.

TABLE 2

| DCI format | Objectives |
| --- | --- |
| 0 | Scheduling of PUSCH |
| 1 | Scheduling of one PDSCH codeword |

TABLE 2-continued

| DCI format | Objectives |
| --- | --- |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2bit power adjustments |
| 3A | TPC commands for PUCCH and PUSCH with single bit power adjustments |
| 4 | the scheduling of PUSCH in one UL cell with multi-antenna port transmission mode |

Referring to Table 2, DCI formats include format 0 for scheduling of a PUCCH, format 1 for scheduling of one PDSCH codeword, format 1A for compact scheduling of one PDSCH codeword, format 1C for compact scheduling of DL-SCH, format 2 for scheduling of a PDSCH in closed-loop spatial multiplexing mode, format 2A for scheduling a PDSCH in open-loop spatial multiplexing mode, formats 3 and 3A for transmitting a transmission power control (TPC) command for an uplink channel, and format 4 for scheduling a PUSCH in one uplink cell in multi-antenna port transmission mode.

The DCI format 1A may be used for scheduling a PDSCH no matter which transmission mode is set in a UE.

The DCI formats may be independently applied by UEs, or PDCCHs of several UEs may be simultaneously multiplexed in one subframe. A PDCCH includes an aggregation of one or some contiguous control channel elements (CCEs). The CCE is a logical allocation unit used to provide a coding rate in accordance with a state of a radio channel to a PDCCH. The CCE refers to a unit corresponding to nine sets of REGs including four resource elements. A base station (BS) may use {1, 2, 4, 8} number of CCEs to form a single PDCCH signal, and here, {1, 2, 4, 8} is called a CCE aggregation level. The number of CCEs used for transmission of a specific PDCCH is determined by a BS (or an eNB) according to a channel state. A PDCCH configured according to each UE is interleaved and mapped to a control channel region of each subframe by a CCE-to-RE mapping rule. A position of the PDCCH may be varied depending on the number of OFDM symbols for a control channel of each subframe, the number of PHICHs, a transmission antenna, frequency shift, and the like.

As described above, channel coding is independently performed on a multiplexed PDCCH of each UE and a cyclic redundancy check (CRC) is applied. An identifier of each UE (UE ID) is masked to a CRC to allow each UE to receive a PDCCH thereof. However, a BS does not provide information regarding where a corresponding PDCCH is placed in an allocated control region of a subframe to each UE. Since each UE does not know where a PDCCH is transmitted and in which CCE aggregation level or DCI format the PDCCH is transmitted to receive a control channel transmitted from the BS, the UE monitors an aggregation of PDCCH candidates within a subframe to discover a PDCCH thereof. This is called blind decoding (BD). Blind decoding may be called blind detection or blind search. Blind decoding refers to a method in which a UE de-masks a UE ID thereof in a CRC portion and subsequently checks a CRC error to determine whether a corresponding PDCCH is a control channel of the UE.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case where the number of downlink component carriers (hereinafter, referred to as 'DL CC') and the number of uplink component carriers (hereinafter, referred to as 'UL CC') are the same as each other is referred to as symmetric aggregation and a case where the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobility ControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 6 illustrates examples of a component carrier and carrier aggregation in the wireless communication system to which the present invention can be applied.

FIG. 6a illustrates a single carrier structure used in an LTE system. The component carrier includes the DL CC and the UL CC. One component carrier may have a frequency range of 20 MHz.

FIG. 6b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 7 illustrates one example of a subframe structure depending on cross carrier scheduling in the wireless communication system to which the present invention can be applied.

Referring to FIG. 7, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

Physical Uplink Control Channel (PUCCH)

Uplink control information (UCI) transmitted through a PUCCH may include scheduling request (SR), HARQ ACK/NACK information, and DL channel measurement information.

The HARQ ACK/NACK information may be generated depending on whether a DL data packet on a PDSCH is successful. In an existing wireless communication system, regarding a DL single codeword transmission, 1 bit is transmitted as ACK/NACK information, and, regarding a DL two-codeword transmission, 2 bits are transmitted as ACK/NACK information.

The channel measurement information refers to feedback information related to a multi-input multi-output (MIMO) technique and may include a channel quality indicator (CQI), a precoding matrix index (PMI), and a rank indicator (RI). These channel measurement information may be generally called a CQI.

In order to transmit the CQI, 20 bits per subframe may be used.

A PUCH may be modulated using binary phase shift keying (BPSK) and quadrature phase shift keying (QPSK). Control information of a plurality of UEs may be transmitted through a PUCCH, and in the case of performing code division multiplexing (CDM) to discriminate among signals from terminals, a constant amplitude zero autocorrelation (CAZAC) sequence having a length of 12 is mainly used. The CAZAC sequence has characteristics of maintaining a predetermined amplitude in a time domain and a frequency domain, thus having qualities appropriate for increasing coverage by lowering a peak-to-average power ratio (PAPR) or cubic metric (CM) of a UE. Also, ACK/NACK information regarding transmission of DL data transmitted through a PUCCH is covered using an orthogonal sequence or orthogonal cover.

Also, control information transmitted on a PUCCH may be discriminated using cyclically shifted sequences having different cyclic shift (CS) values. The cyclically shifted sequence may be generated by cyclically shifting a base sequence by a specific CS amount. The specific CS amount is indicated by a CS index. The number of available cyclic shifts may be varied depending on delay spreading of a channel. Various types of sequence may be used as a base sequence and the aforementioned CAZAC sequence is an example.

Also, an amount of control information a UE may transmit in a single subframe may be determined according to the number of SC-FDMA symbols (that is, SC-FDMA symbols excluding an SC-FDMA used for transmission of a reference signal (RS) for coherent detection of a PUCCH) which may be used for transmission of control information.

In the 3GPP LTE system, a PUCCH is defined by a total of eight different formats depending on transmitted control information, a modulation scheme, an amount of control information, and the like, and attributes of transmitted uplink control information (UCI) may be summarized according to PUCCH formats as shown in Table 3 below.

TABLE 3

| PUCCH format | Modulation scheme | # of bits per sub-frame | Usage |
|---|---|---|---|
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for separate transmission of an SR. In the case of separate SR transmission, a non-modulated waveform is applied.

PUCCH format 1a or 1b is used for transmission of HARQ ACK/NACK. In cases where HARQ ACK/NACK is transmitted alone in a certain subframe, the PUCCH format 1a or 1b may be used. Alternatively, HARQ ACK/NACK and an SR may be transmitted in the same subframe using the PUCCH format 1a or 1b.

As discussed above, the PUCCH format 1a or 1b may be used when an SR is transmitted together with HARQ ACK/NACK. A PUCCH index regarding HARQ A/N is implicitly determined from a lowest CCE index mapped to a related PDCCH.

Multiplexing Negative SR with A/N

: A UE transmits A/N with an A/N PUCCH resource mapped to a lowest CCE index used in a PDCCH Multiplexing Positive SR with A/N : A UE transmits A/N using an SR PUCCH resource allocated by a BS The PUCCH format 2 is used to transmit a CQI, and the PUCCH format 2a or 2b is used to transmit a CQI and HARQ ACK/NACK.

In the case of an extended CP, the PUCCH format 2 may be used to transmit a CQI and HARQ ACK/NACK.

An SR resource of a UE is set up or released through RRC Connection Reconfig. (Radio Resource Config. Dedicated (Physical config. Dedicated (SR config))).

Here, SR resource for a maximum of 2048 UEs in a sub-frame may be allocated. This means that 2048 logical indices are defined for a PUCCH and logically 2048 physical resources regarding PUCCH format 1 to 3 may be mapped.

Regarding setup of SR resource of each UE, SR periodicity may be set to 1 ms to 80 m s according to an SR configuration index, and an SR subframe offset may also be designed to be set according to an index.

SR signaling of a UE is defined to use simple On-Off Keying (O.O.K) scheme, and it is defined that D(0)=1: Request a PUSCH resource (positive SR), Transmitting nothing: not request to be scheduled (negative SR).

Also, an SR is designed to use CAZAC sequence having a length of 12 and OC sequences having a length of 3 to allocate an SR for a maximum of 36 UEs through a PUCCH 1RB (in the case of normal CP).

FIG. 8 illustrates one example of a type in which PUCCH formats are mapped to a PUCCH region of an uplink physical resource block in the wireless communication system to which the present invention can be applied In FIG. 8, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 8, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 9 illustrates a structure of an ACK/NACK channel in the case of a general CP in the wireless communication system to which the present invention can be applied.

In FIG. 9, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 9, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed using the time domain spreading using the OCC.

FIG. 10 is a view illustrating a structure of a CQI channel in the case of a general CP in a wireless communication system to which the present invention can be applied.

Among SC-FDMA symbols 0 to 6 of a slot, SC-FDMA symbols 1 and 5 (second and sixth symbols) are used for transmission of a demodulation reference signal (DMRS) and CQI information may be transmitted in the other remaining SC-FDMA symbols. Meanwhile, in the case of an extended CP, one SC-FDMA symbol (SC-FDMA symbol 3) is used for DMRS transmission.

The PUCCH formats 2/2a/2b supports modulation based on a CAZAC sequence, and a QPSK-modulated symbol is multiplied to a CAZAC sequence having a length of 12. A CS of a sequence is changed between a symbol and a slot. Orthogonal covering is used for a DMRS.

A reference signal (DMRS) is carried in two SC-FDMA symbols spaced apart by a three SC-FDMA symbol interval, among seven SC-FDMA symbols included in one slot, and CQI information is carried in the other remaining five SC-FDMA symbols. Two RSs are used in one slot to support a high speed UE. Also, each UE is discriminated using a CS sequence. CQI information symbols are modulated in the entire SC-FDMA symbols and transferred, and the SC-FDMA symbols are configured as one sequence. That is, a UE modulates a CQI to each sequence and transmits the same.

The number of symbols that can be transmitted in one TTI is 10 symbols, and modulation of CQI information is determined to QPSK. In the case of using QPSK mapping for SC-FDMA symbols, a 2-bit CQI value may be carried, and thus, a 10-bit CQI value may be carried in one slot. Thus, a maximum of 20-bit CQI value may be carried in one sub-frame. In order to spread CQI information in a frequency domain, a frequency domain spreading code is used.

As the frequency domain spreading code, a CAZAC sequence having a length of 12 may be used. Each control channel may be differentiated by applying a CAZAC sequence having a different cyclic shift value. IFFT is performed on frequency domain-spread CQI information.

12 different UEs may be orthogonally multiplexed on the same PUCCH RB by 12 cyclic shift which are equally spaced from each other. In the case of a general CP, a DMRS sequence on SC-FDMA symbols 1 and 5 (on SC-FDMA symbol 3 in the case of an extended CP) is similar to a CQI signal sequence on a frequency domain but the same modulation as that applied to CQI information is not applied.

A UE may be semi-statically set by higher layer signaling to periodically report different CQI, PMI, and RI types on the PUCCH resource indicated by PUCCH resource indices $(n_{PUCCH}^{(1,\tilde{p})}, n_{PUCCH}^{(2,\tilde{p})}, n_{PUCCH}^{(3,\tilde{p})})$. Here, the PUCCH resource index $(n_{PUCCH}^{(2,\tilde{p})})$ is information indicating a PUCCH region used for PUCCH format 2/2a/2b transmission and a cyclic shift (CS) value to be used.

FIG. 11 is a view illustrating a method for multiplexing ACK/NACK and SR in a wireless communication system to which the present invention can be applied.

A structure of an SR PUCCH format 1 is the same as the structure of the ACK/NACK PUCCH format 1a/1b illustrated in FIG. 11.

The SR is transmitted using an ON-OFF keying (OOK) scheme. In detail, the UE may transmit an SR having a modulation symbol d(0)=1 to request a PUSCH resource (positive SR), and in the case of not requesting scheduling (negative SR), the UE transmits nothing.

Since the PUCCH structure for ACK/NACK is re-used for the SR, different PUCCH resource indices (i.e., a combination of a different cyclic shift (CS) and an orthogonal code) in the same PUCCH region may be allocated to an SR (PUCCH format 1) or HARQ ACK/NACK (PUCCH format 1a/1b). A PUCCH resource index to be used by the UE for SR transmission is configured by UE-specific higher layer signaling.

In cases where the UE is required to transmit a positive SR in a CQI transmission-scheduled subframe, the EU may drop a CQI and transmit only an SR. Similarly, when a situation in which an SR and an SRS are simultaneously transmitted occurs, the UE may drop the CQI and transmit only the SR.

In cases where the SR and ACK/NACK are generated in the same subframe, the UE transmits ACK/NACK on an SR PUCCH resource allocated for positive SR. Meanwhile, in the case of negative SR, the UE transmits ACK/NACk on an allocated ACK/NACK resource.

FIG. 11 illustrates constellation mapping for simultaneous transmission of ACK/NACK and SR. Specifically, FIG. 11 illustrates that NACK (or NACK, NACK in the case of two MIMO codewords) is modulation-mapped to +1. Accordingly, when discontinuous transmission (DTX) occurs, it is processed as NACK.

ACK/NACK resource composed of CS, OC, and a physical resource block (PRB) for SR and persistent scheduling may be allocated to a UE through radio resource control (RRC). Meanwhile, for dynamic ACK/NACK transmission and non-persistent scheduling, ACK/NACK resource may be implicitly allocated to a UE by a lowest CCE index of a PUCCH corresponding to a PDSCH.

The UE may transmit SR in cases where resource for uplink data transmission is required. That is, transmission of SR is event-triggered.

The SR PUCC resource is configured by higher layer signaling, except a case where SR is transmitted together with HARQ ACK/NACK using PUCCH format 3. That is, the SR PUCCH is configured by SchedulingRequestConfig information element transmitted through a radio resource control (RRC) (e.g., an RRC connection reconfiguration message).

Bundling

The UE may bundle ACK/NACK information regarding PDSCHs corresponding to a bundling size based on time domain PDCCH bundling scheduling and transmit ACK/NACK at a PUCCH transmission time. The BS may determine whether to perform retransmission through a PUCCH transmitted from the UE, and when retransmission is performed, the BS may retransmit a PDSCH corresponding to a bundling size again. That is, when at least one of PDSCHs within a bundling size is not accurately received, the UE may transmit NACK information to the BS, and when the BS receives the NACK information, the BS retransmits all of PDSCHs corresponding to the bundling size.

Here, in cases where the BS transmits one transport block (TB) in a PDSCH, the UE may transmit ACK/NACK information expressed by 1 bit using the PUCCH format 1a. Or, in the case of transmitting two TBs in a PDSCH, the UE may transmit ACK/NACK information expressed by 2 bits using the PUCCH format 1b. However, in cases where one or more S cells are configured, the UE may use the PUCCH format 1b or the PUCCH format 3 using a channel selection technique. Here, the channel selection technique refers to a technique of dividing remaining ACK/NACK bits by PUCCH resource and transmitting the same when information intended to be transmitted has 2 bits or greater because a bit size which can be transmitted using the PUCCH format 1b is 2. Thus, information transmitted by the UE may be differentiated depending on a position of a PUCCH resource in which a PUCCH is transmitted, as well as an ACK/NACK bit value. When the PUCCH format 1b or the PUCCH format 3 is used, the same transmission procedure as that of the PUCCH format 1b and the PUCCH format 3 using channel selection may be performed in the LTE/LTE-A system.

An index of a PUCCH format resource may be determined as expressed by Equation 1 and Equation 2 below depending on the antenna ports used for PUCCH transmission.

Equation 1 indicates the case of using an antenna port 1 and Equation 2 indicates the case of using an antenna port 2.

$$n_{PUCCH}^{(1,\tilde{p}=p0)} = n_{CCE} + N_{PUCCH}^{(1)} \quad \text{[Equation 1]}$$

$$n_{PUCCH}^{(1,\tilde{p}=p0)} = n_{CCE} + 1 + N_{PUCCH}^{(1)} \quad \text{[Equation 2]}$$

Here, $N_{PUCCH}^{(1)}$ is determined through higher layer signaling and $n_{CCE}$ refers to a smallest CCE index in which a DCI format bundled in a PDCCH is transmitted. Also, in cases where one or more S cells are configured, PUCCH resource may be determined in the same manner as that of a method of the LTE/LTE-A system or may be indicated through higher layer signaling.

Multiplexing

The aforementioned bundling technique may have shortcomings in that when the BS performs retransmission according to information of a PUCCH transmitted from the UE, a PUCCH corresponding to the same bundling size as that at the first transmission. Thus, if ACK/NACK regarding each PDSCH belonging to the bundling size is multiplexed and transmitted, the BS may effectively operate by retransmitting only a PDSCH corresponding to NACK information. For example, in cases where a bundling size is 4 and a transport block is 1, ACK/NACK bits to be transmitted by the UE is 4 bits, and thus, the UE may transmit ACK/NACK information to the BS using the PUCCH format 1b or the PUCCH format 3 based on channel selection technique. As described above, the channel selection technique refers to a technique of dividing remaining ACK/NACK bits by PUCCH resource and transmitting the same when information intended to be transmitted is 2 bits or greater because a bit size which can be transmitted using the PUCCH format 1b is 2. That is, since transmitted information is determined to be different depending on a position of a PUCCH resource, the UE may transmit information of 2 bits or greater to the BS by only 2 bits.

In the case of using the PUCCH format 1b based on the channel selection technique, a resource mapping table may be configured to have various forms depending on a bundling size and a transport block size.

Table 4 shows an example of a resource mapping table when a total ACK/NACK bit size is 2.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

The UE transmits bits (b(0)b(1)) expressing ACK/NACK information to the BS through indicated PUCCH resource $n_{PUCCH}^{(1)}$ among PUCCH resource configured as a higher layer.

Here, the total ACK/NACK bit size (every ACK/NACK information to be transmitted) may be configured as (bundling size×transport block size (number)). That is, HARQ-ACK(0) refers to ACK/NACK regarding a PDSCH of a first subframe within a bundling size, HARQ-ACK(1) refers to ACK/NACK regarding a PDSCH of a second subframe within the bundling size, and HARQ-ACK(n) refers to ACK/NACK regarding a PDSCH of an nth subframe within the bundling size.

In the case of transmitting the PUCCH in this manner, an index of PUCCH format resource may be expressed as $n_{PUCCH,i}^{(1)}$, and may be expressed as $n_{PUCCH,i}^{(1)}$ and $n_{PUCCH,i+1}^{(1)}$ when a transport block size is 2.

As described above, an index of the PUCCH format resource may be determined using the smallest CCE index ($n_{CCE}$) in which the bundled DCI format is transmitted in the PDCCH and the value ($n_{PUCCH}$) configured through higher layer signaling.

Also, in order to operate as shown in Table 4, the BS may a specific field of a DCI format for the purpose of indicating one or more PUCCH resource values among four resources configured as a higher layer.

For example, the BS may define and use an acknowledge resource indication/indicator (ARI) of the DCI format, or may use a transmission power control (TPC) command field.

Also, the UE may transmit ACK/NACK information to the BS using the PUCCH format 3. Resource used to transmit the PUCCH format 3 may be configured as a higher layer. Here, the BS may use a specific field within the DCI format to indicate a resource value of the PUCCH format 3 among four resources or more resources configured as a higher layer. For example, the BS may define and use an acknowledge resource indication/indicator (ARI) field within the DCI format or may use a transmission power control (TPC) command field.

Uplink Channel Coding in LTE-Release 8 for PUCCH Format

IN LTE uplink transmission, specific control channels are encoded using linear block codes as shown in Table 5 below.

If input bits to the linear block codes are $a_0, a_1, a_2, \ldots, a_A$, encoded and output bits are expressed as $b_0, b_1, b_2, \ldots, b_B$.

Here, B=20 and $b_i = (\Sigma_{n=0}^{A-1}(a_n \cdot M_{i,n})) \bmod 2$, i = 0, 1, 2, \ldots, B-1.

Table 5 shows an example of base sequences regarding (20,A) code.

TABLE 5

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

The encoded bits are mapped to code-time-frequency resource as illustrated in FIG. 12.

First ten encoded bits are mapped to specific code-time-frequency resource, and last ten encoded bits are mapped to different code-time-frequency resource. Here, a frequency space between the first ten encoded bits and the last ten encoded bits is significant spaced apart.

This is to obtain a frequency diversity effect regarding the encoded bits.

FIG. 12 is a view illustrating an example in which encoded bits are mapped to resource.

Uplink Channel Coding in LTE-A (Release 10

In LTE-Rel 8, when a UCI is transmitted in the PUCCH format 2, a maximum of 13-bit CSI is Reed-Muller (RM)-coded of (20,A) of Table 6.

Meanwhile, when the UCI is transmitted in a PUSCH, a maximum of 11-bit CQI is RM-coded of (32,A) of Table 6, and cutting, truncation, or circular repetition is performed to adjust a code rate to be transmitted in the PUSCH.

Table 6 shows an example of base sequences regarding (32.0) code.

TABLE 6

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 1 | 0 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 0 | 1 | 1 | 1 | 0 | 1 | 0 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Meanwhile, in LTE-A, the PUCCH format 3 has been introduced to transmit UCI (A/N and SR) bits of a maximum of 21 bits, and 48 coded bits may be transmitted in a situation of a normal CP of the PUCCH format 3.

Thus, when the UCI but number is 11 bits or less, circular repetition is used to increase according to the number of coded bits of the PUCCH format 3 using the (32,A) RM coding of Table 6.

Also, when the UCI bit number exceeds 11 bits, since the number of (32,A) RM code basis sequences of Table 6 is insufficient, two (32,A) RM coding blocks are used to create two coded bits (which is called dual RM) as illustrated in FIG. 13. Also, these are cut or truncated so as to fit to the number of PUCCH format 3 coded bit number, interleaved, and transmitted.

FIG. 13 is a view illustrating an example of a dual-RM coding method.

In cases where a maximum of 21-bit UCI is transmitted in a PUSCH, when the UCI bit number is 11 bits or less, truncation or circular repetition is performed thereon to fit a code rate at which the bits are transmitted in the PUSCH using (32,A) RM coding like the existing Rel-8.

However, in cases where the UCI bit number exceeds 11 bits two coded bits are created using dual RM and truncation or circular repetition is performed thereon to fit a code rate at which the coded bits are transmitted in the PUSCH.

In detail, referring to a bit configuration order of each UCI contents, in cases where the use of the PUCCH format 3 is configured in an SR transmission subframe, when SR and A/N are transmitted in the PUCCH format 3 or the PUSCH, A/N is preferentially disposed and the SR is disposed next to the A/N to configure a UCI bit.

Also, in cases where A/N and CSI simultaneous transmission is configured, the CSI is disposed after the A/N and SR to configure a UCI bit.

In the existing LTE-A system, a method of aggregating up to five carriers has been discussed.

In the next-generation communication system such as 5G, or the like, a method (enhanced-CA:eCA) of aggregating carriers more than 5 (8, 16, or 32, etc.) may be considered to deal with more traffic.

As the number of aggregated carriers is increased, an information amount of a control channel for feeding back information regarding corresponding traffic, as well as an amount of traffic, is increased.

For example, a size of HARQ-ACK/NACK, one of uplink control channel information (UCI) regarding downlink traffic (e.g., PDSCH transmission), may also be increased in line with the increase in the downlink traffic.

The PUCCH format 3 has been introduced to transmit a maximum of 21-bit UCI (A/N and SR) in the LTE-A system.

In the PUCCH format 3, in cases where a size of the UCI is 11 bit or less, one RM coding block is used, and in cases where the size of the UCI is greater than 11 bits, two RM coding blocks are attached to be used (dual RM coding scheme).

When the number of input bits is A, the RM coding block outputs 32 RM coded bits (i.e. (32, A) RM coding).

Here, in cases where single RM is used on the basis of the PUCCH format 3, the 32-coded bits are circular repeated again to adjust a final coded bit number to 48 bits.

Also, in cases where dual RM is used on the basis of the PUCCH format 3, a final coded bit number is adjusted to 24 bits and a final coded bit number is adjusted to 48 bits through a process (hereinafter, referred to as "truncation") of cutting, starting from least significant bit (LSB) of each of two 32 coded bits.

Meanwhile, in cases where a size of the UCI is greater than 21 bits in eCA, a problem that the PUCCH format 3 cannot be applied as is arises.

Thus, a method for configuring a new PUCCH format according to an information amount of increased uplink control channels and transmitting HARQ-ACK/NACK therethrough will be described.

A new PUCCH format configuration proposed in this disclosure and an HARQ ACK/NACK transmission method according the new PUCCH format configuration refers to a method for transmitting HARQ ACK/NACK based on PUCCH format configured multiple RB pairs.

A/N Transmitting Method Based on New PUCCH Format Including Multiple RB Pairs

Hereinafter, a method for transmitting an HARQ-ACK (A/N) based on a PUCCH format including multiple RB pairs will be described.

Compared with a PUCCH resource regarding the existing PUCCH format 3, which occupies one RB pair, the corresponding method defines a new PUCCH format in which a PUCCH (A/N) resource regarding a UCI of enhanced CA (eCA) occupies multiple RB pairs.

In detail, according to the method, a UCI feedback regarding multiple carrier-aggregated cells is defined as a (new) PUCCH format (hereinafter, referred to as a "multi-RB PUCCH format") including multiple RB pairs of a single cell (e.g., PCell) and A/N is transmitted using the multi-RB PUCCH format.

Here, the single cell may be a PCell, but the present invention is not limited thereto and the single cell may be a PSCell or an SCell.

Also, according to the corresponding method, multiple component carriers (CCs) (or multiple cells) may be controlled to be grouped and managed.

Thus, the following cases will be classified according to a relationship between a cell group (CG) and a PUCCH resource.

First, in cases where one UCI regarding HARQ-ACK is allocated to multiple PUCCH (A/N) resources, RBs (and RB pairs) regarding each PUCCH resource may be independently allocated.

As illustrated in FIG. 14A, each PUCCH resource may be allocated to noncontiguous RBs.

However, the corresponding method defines a PUCCH format in which one UCI regarding HARQ0ACK is allocated to one PUCCH (A/N) resource.

That is, in the multi-RB PUCCH format, one UCI is allocated to one PUCCH resource and one PUCCH resource is mapped to multiple RBs (RB pairs).

Thus, it may be preferred that the PUCCH resources are allocated to contiguous RBs of each slot as illustrated in FIG. 14B, rather than being independently allocated to RBs (and RB pairs).

In the following methods, it is assumed that multiple RBs (or RB pairs) regarding one PUCCH resource are contiguously allocated in each slot as illustrated in FIG. 14B, and this will be described with reference to FIGS. 16 TO 18.

Meanwhile, the multi RB PUCCH format newly defined and proposed in this disclosure includes multiple RB pairs.

Thus, it is required to define an RB pair forming a PUCCH format to be different from the existing format.

FIG. 15 illustrates an example of a method for configuring an RB pair in a PUCCH resource proposed in this disclosure.

First, as illustrated in FIG. 15A, two RBs forming an RB pair may be allocated to face each other symmetrically in two slots.

The method of FIG. 15A is the same as a method of configuring an RB pair regarding the existing PUCCH format.

In another method of configuring an RB pair, RBs allocated to PUCCH resource in each slot may be sequentially allocated to RB pairs as illustrated in FIG. 15B.

For the purposes of description, in the method proposed in this disclosure, RBs facing each other symmetrically in two slots as in the method of FIG. 15A will be referred to as one RB pair.

FIG. 14 is a view illustrating an example of a method of mapping PUCCH resource to an RB, proposed in this disclosure.

In detail, FIG. 14A illustrates an example of a case in which PUCCH resources are non-contiguously mapped to RBs, and FIG. 14B illustrates an example of a case in which PUCCH resources are contiguously mapped to RBs.

Hereinafter, as a method of transmitting HARQ ACK using the multi-RB PUCCH format, (1) a method of individually coding A/N information by cell groups (CGs) and (2) a method of coding A/N information with respect to the entire CCs will be separately described.

1. Individually A/N Coding by Cell Groups

In this method, A/N (HARQ-ACK) information is coded by CGs to form one subset of PUCCH resources.

Here, if one RB pair is physically mapped to the subset of the PUCCH resources, it may be easy to manage an operation related to A/N information by CGs (e.g., transmission of only A/N regarding a specific scheduled CG).

Thus, here, when A/N information coded by CGs 1610 and 1620 is mapped to one RB pair as illustrated in FIG. 16.

For example, when following a coding chain of the existing PUCCH format 3, in cases where the number of A/N bits of each CG is 11 bits or less, the coding chain has a single RM structure, and in cases where the number of A/N bits of each CG exceeds 11 bits, the coding chain has a dual RM structure.

Also, no matter whether the A/N coding chain of each CG has the single RM structure or the dual-RM structure, it is mapped to one RB pair.

In cases where there is no scheduling information regarding a specific CG, A/N transmission regarding the corresponding CG and transmission of an associated RB pair may be dropped.

(1.1) Interleaving

Hereinafter, a method of individually coding A/N by CGs and subsequently performing interleaving will be described.

First, it may be limited such that interleaving is not performed between outputs of an RM encoder corresponding to different PUCCH resources.

Referring to FIG. 16, after A/N encoding is performed on one CG, an output is allocated to one specific PUCCH resource and/or one RB pair, and after A/N encoding is performed on a next CG, an output is allocated to another PUCCH resource and/or RB pair.

Here, an RB of the same frequency is not allocated to contiguous slots forming one RB pair.

FIG. 16 is a view illustrating an example of a method of individually coding ACK/NACK by cell groups (CGs) and allocating the same to each PUCCH resource, proposed in this disclosure.

Hereinafter, a method of coding ACK/NACK regarding the entire CCs will be described.

2. Method of Performing ACK/NACK Coding on Entire CCs (or Cell Groups)

FIG. 17 is a view illustrating an example of performing ACK/NACK coding on the entire cell groups and allocating the same to a plurality of RB pairs, proposed in this disclosure.

As illustrated in FIG. 17, ACK/NACK information regarding the entire CCs (or CGs) may be coded, without being discriminated by CGs, and transmitted over multiple RB pairs.

When M number of RB pairs are used to transmit UCI regarding ACK/NACK, partitioning the entire ACK/NACK bits into M number of bits may be considered.

For example, after the number (N) of UCI bits regarding ACK/NACK of the entire CCs is divided equally as possible and RM coding is performed, when the bits are distributed to M number of RB pairs, the inside of a coding chain 1710 of FIG. 17 may be divided into multiple RM coding blocks as (1) to (3) below.

$$\text{ceil}\left(\frac{N}{M}\right) \leq 11: \qquad (1)$$

The inside of the coding chain of FIG. 17 has M number of single RM structures.

$$\text{ceil}\left(\frac{N}{M}\right) = 12: \qquad (2)$$

The inside of the codling chain of FIG. 17 has k number of dual RM structures and (M−k) number of single RM structures.

Here, 1≤k≤M. For example, it may be set such that k=mod(N, M).

$$\text{ceil}\left(\frac{N}{M}\right) > 12: \qquad (3)$$

The inside of the coding chain of FIG. 17 has M number of dual RM structures.

(2.1) Interleaving

Hereinafter, a method for coding ACK/NACK regarding the entire CCs and performing interleaving will be described.

When ACK/NACK (RM) coding is performed, multiple RM coding chains may be generated, and performing interleaving on the multiple RM coding chains may be considered for a diversity effect, or the like.

(1) and (2) below show specific examples of the interleaving scheme.

(1) Method of not performing interleaving between RM encoder outputs (without inter-Reed-Muller (RM) interleaving): Multiple outputs of each RM coding chain are sequentially mapped to multiple PUCCH resources without conversion (or without interleaving).

(2) Method of performing interleaving between RM encoder outputs (with inter-RM interleaving): Multiple outputs of each RM coding chain are mutually interleaved.

That is, changing of positions of bit indices such that multiple outputs of each RM coding chain are mapped to multiple slots and/or PUCCH resources and/or RBs may be considered.

For example, a total of M number of single and/or dual RM outputs may be sequentially interleaved (in units of 2 bits in the case of QPSK).

After the outputs of the RM encoder are RM-interleaved therebetween, generated symbols may be mapped to QPSK symbols, and in order to allocate the generated symbols to actually physical PUCCH resources, an inter-PUCCH interleaving method such as (2-A) and (2-B) described hereinafter may be applied.

(2-A) RB pair-first mapping method: As illustrated in FIG. 18A, an RM-encoded symbol sequence first fills a specific RB pair, and RB pairs in next orders are sequentially filled.

For example, it is assumed that 48 coded symbols are mapped to two RB pairs. When, among RB pairs, RB_{j,k} is an RB corresponding to k slot of jth RB pair, 48 coded symbols may be mapped by 12 coded symbols each time in order of ① (RB_{0, 0}, RB_{0, 1}, RB_{1, 0}, RB_{1, 1} or in order of ② RB_{0, 1}, RB_{0, 0}, RB_{1, 1}, RB_{1, 0}.

(2-B) Slot-first mapping method: As illustrated in FIG. 18B, an RM-encoded symbol sequence sequentially fills RBs of a first slot (slot 0) and subsequently fills RBs of a next slot (slot 1).

For example, it is assumed that 48 coded symbols are mapped to two RB pairs, as in (2-A). When, among RB pairs, RB_{j,k} is an RB corresponding to a k slot of jth RB pair, 48 coded symbols may be mapped by 12 coded symbols each time in order of ① RB_{0, 0}, RB_{1, 0}, RB_{0, 1}, RB_{1, 1} or ② RB_{1, 0}, RB_{0, 0}, RB_{1, 1}, RB_{0, 1}.

3. ARI (or RRC Parameters for PUCCH Resource)

Since information regarding one UCI is allocated to one PUCCH resource, parameter(s) for PUCCH resource is preferably set to be the same for every CG.

Also, in order to differentiate a plurality of RB pairs associated with the corresponding PUCCH resource, it is required to receive implicit signaling or it is required to define a rule in advance.

4. Transmit Power Control (TPC)

In order to perform PUCCH transmit power control related to HARQ-ACK feedback proposed in this disclosure, one TPC may be applied to multi-RB PUCCH format resource.

In detail, a TPC command for transmitting multi-RB PUCCH format carrying A/N may be signaled through a DCI of DL grant regarding a specific cell (e.g., Pcell) of the entire CCs.

Here, an ARI may be signaled through a DCI of DL grant regarding the other remaining cells, excluding a cell corresponding to the TPC signaling.

5. PUCCH/RB Allocation

Hereinafter, a method of allocating PUCCH resource to a resource block (RB) will be described.

In cases where one PUCCH resource is allocated to multiple RB pairs, preferably, a DMRS sequence and an OCC index are applied with respect to the entirety of associated RB pairs.

That is, a long sequence forming a DMRS is generated over the entirety of associated RB pairs and the same OCC index is applied to every associated RB pair.

Here, a set of RB pairs associated with one PUCCH resource may be set in advance or implicitly determined.

Also, in order to enhance channel estimation performance of the DMRS, it may be preferred to continuously allocate RB pairs associated with one PUCCH resource.

Also, since PUCCH resources (and associated RB pairs) are independent from each other, RB pairs used for transmission of one UCI may be arbitrarily combined.

DMRS sequence: long DMRS per RB

OCC index: same OCC index for per RB pair

RB pair combination: Contiguous RB pairs are advantageous

6. Method of Multiplexing Between PUCCHs

Each PUCCH resource configured on the basis of the multi-RB PUCCH format structure discussed above will be defined as a "multi-RB PUCCH resource".

Here, the multi-RB PUCCH format may be multiplexed between multi-RB PUCCH resources on the same RB(s) or may be multiplexed with a PUCCH type including multiple PUCCH resources.

Also, the multi-RB PUCCH format may be multiplexed with the existing PUCCH format (e.g., PUCCH format 3).

In this manner, in order to enable multiplexing, the multi-RB PUCCH format may basically have the same structure as that of the existing PUCCH format.

For example, on the assumption that the multi-RB PUCCH format has the same structure as that of the existing PUCCH format 3, a DMRS symbol may be allocated to two symbols per slot, a data (UCI) symbol may be allocated to five symbols excluding two DMRS symbols, and a length-5 OCC may be applied.

Also, in a subframe in which a sounding reference signal (SRS) is transmitted, a length-5 OCC may be applied in a first slot and a length-4 OCC may be applied in a second slot.

Multiplexing Between Multi-RB PUCCHs

Hereinafter, a method for performing multiplexing to distinguish between a case where RB pairs mapped to PUCCH resources entirely or partially overlap when A/N information is transmitted using multiple PUCCH resources discussed above will be described.

A multiplexing method in a data region (UCI transmission region) and a DMRS region may be varied depending on the number of RBs forming each PUCCH resource and the number of shared RBs, as follows.

First, K number of RBs may be set to overlap between a multi-RB PUCCH format (i.e., NPF) including N number of RBs and a multi-RB PUCCH format (i.e., MPF) including M number of RBs.

Here, N≥M≥K, and N, M, and K represent an integer which is not negative.

Also, MPF in the case of M=1 may be the same as that of the existing PUCCH format 3.

Here, K may be limited to be always set only with the same value as M.

That is, the smaller multi-RB PUCCH format (resource) may be included in the larger multi-RB PUCCH format (resource).

In cases where N=M=K in the relationship among N, M, and K, i.e., in cases where all RB overlap, while the number of RBs forming different PUCCH resources based on the same multi-RB PUCCH format is the same, different OCC indices may be used for multiplexing in a data region (A/N transmission region) of two PUCCH resources.

Meanwhile, the DMRS region may be defined to operate as follows.

(Method 1) Different DMRS Cyclic Shifts (CSs) are Applied in a DMRS Region of Each PUCCH Resource.

As illustrated in Table 7, different DMRS CS values correspond to each OCC index applied to a data region.

Table 7 is a table illustrating an example of combinations of an OCC index of a data region and a CS value of a DMRS region in the entire RB regions in the case of multiplexing between NPFs.

TABLE 7

| OCC index of data region | CS value of DMRS region | PUCCH resource |
|---|---|---|
| 1 | 0 | NPF1 |
| 2 | 3 | NPF2 |
| 3 | 6 | NPF3 |
| 4 | 8 | NPF4 |
| 5 | 10 | NPF5 |

(Method 2) (Combination of) Different DMRS CS Value and OCC Index is Applied in a DMRS Region of Each PUCCH Resource.

As illustrated in Table 8 below, a combination of different DMRS OCC index and DMRS CS values may correspond to each OCC index applied to a data region.

Also, multiplexing may be performed between the same DRMS OCC indices through different DMRS CS values, and DMRS CS values between PUCCH resources having the same DMRS OCC index may be set to be spaced apart from each other by a maximum interval.

As illustrated in FIG. 8, in cases where numbers of resources having the same DMRS OCC index are 2, 3, and 4, a CS interval may have an equal interval of 6, 4, and 3, respectively.

Table 8 below illustrates an example of a combination of an OCC index of a data region, an OCC index of a DMRS region, and a CS value of a DMRS region in the entire RB regions in the case of multiplexing between NPFs.

TABLE 8

| OCC index of data region | OCC index of DMRS region | CS value of DMRS region | PUCCH resource |
|---|---|---|---|
| 1 | 1 | 0 | NPF1 |
| 2 | 1 | 6 | NPF2 |
| 3 | 2 | 0 | NPF3 |
| 4 | 2 | 4 | NPF4 |
| 5 | 2 | 8 | NPF5 |

In the above, different OCC indices may be applied for multiplexing to symbols of a data region of NPF and MPF sharing K number of RBs.

For example, in cases where two NPFs are multiplexed to symbols of a data region with OCC index 1 and OCC index 2, only OCC indices 3 to 5 as illustrated in Table 9 below are allocated to all MPFs co-existing in the data region of the NPF.

Table 9 illustrates an example of an OCC index of a data region in the entire RB regions shared in the case of multiplexing between NPF and MPF.

TABLE 9

| OCC index of data region | PUCCH resource |
|---|---|
| 1 | NPF1 |
| 2 | NPF2 |
| 3 | MPF1 |
| 4 | MPF2 |
| 5 | MPF3 |

Classification Based on Generation Scheme of DMRS Sequence

Second, a multiplexing method between PUCCH formats may be classified as follows according to a generation scheme of a DMRS sequence.

(Method 1) Case where a DMRS Sequence is Generated with an Overall Length of Multi-RB In the above, different OCC indices may be applied to symbols of a DMRS region of the NPF (multi-RB PUCCH format including N number of RBs) and the MPF (multi-RB PUCCH format including M number of RBs) sharing K number of RBs, for multiplexing.

For example, in cases where OCC index 1 is applied to symbols of a DMRS region of the NPF, OCC index 2 may be applied to all MPFs coexisting (or overlapping) with a region of the NPF.

Meanwhile, multiplexing may be performed between NPFs or between MPFs (having the same DMRS OCC index) through different DMRS CS values.

Table 10 below illustrates an example of a multiplexing method between multi-RB PUCCH formats sharing k number of RBs using OCC indices of DMRS regions and CS values of DMRS regions.

Also, in this case, like Table 9, DMRS CS values may be spaced apart from each other at a maximum level between the same PUCCH format resources (having the same DMRS OCC index).

As illustrated in Table 10, when the number of PUCCH resources having the same DMRS OCC index is 2, 3, and 4, DMRS CS intervals have an equal interval of 6, 4, and 3, respectively.

Table 10 illustrates an example of a multiplexing method between NPF and MPF within the entire shared RB region in case where a DMRS sequence is generated with an entire multi-RB length.

TABLE 10

| OCC index of data region | OCC index of DMRS region | CS value of DMRS region | PUCCH resource |
|---|---|---|---|
| 1 | 1 | 0 | NPF1 |
| 2 | 1 | 6 | NPF2 |
| 3 | 2 | 0 | MPF1 |
| 4 | 2 | 4 | MPF2 |
| 5 | 2 | 8 | MPF3 |

(Method 2) Case where DMRS Sequence is Generated in Single RB Unit

In the above, different OCC indices and/or different CSs may be applied to symbols of a DMRS region of the NPF and the MPF sharing K number of RBs, for multiplexing.

Table 11 to Table 13 below illustrate examples of a multiplexing method between the NPF and the MPF within a specific RB in cases where a DMRS sequence is generated in a single RB unit.

For example, as illustrated in Table 11, when OCC index 1 is applied to symbols of a DMRS region of a specific RB of the NPF, OCC index 2 may be applied to all MPFs coexisting (or overlapping) with the corresponding RB.

Here, multiplexing may be performed between the NPFs or between MPFs through different DMRS CS values as discussed above in Table 10.

Table 11 illustrates an example of a case where different DMRS OCC indices are used between the NPF and the MPF.

TABLE 11

| OCC index of data region | OCC index of DMRS region | PUCCH resource |
|---|---|---|
| 1 | 1 | NPF1 |
| 2 | 1 | NPF2 |
| 3 | 2 | MPF1 |
| 4 | 2 | MPF2 |
| 5 | 2 | MPF3 |

Or, as illustrated in Table 12 below, when specific CS values (e.g., DMRS CS 1 and DMRS CS 2) for the NPF are applied to symbols of a DMRS region of a specific RB of the NPF regardless of DMRS OCC index or in a state in which the DMRS OCC index is fixated (to the same value regarding two PUCCH formats), values other than the corresponding specific CS values (DMRS CS 1 and DMRS CS 2) are applied to all MPFs coexisting (or overlapping) with the corresponding RB.

Table 12 illustrates an example of a case where NPF and MPF use different DMRS CSs.

TABLE 12

| OCC index of data region | CS value of DMRS region | PUCCH resource |
|---|---|---|
| 1 | 0 | NPF1 |
| 2 | 3 | NPF2 |
| 3 | 6 | MPF1 |
| 4 | 8 | MPF2 |
| 5 | 10 | MPF3 |

Or, as illustrated in Table 13, NPF and MPF may be multiplexed in a specific RB by combining the DMRS OCC index and the DMRS CS value.

That is, in cases where OCC index 1 is applied to symbols of a DMRS region of a specific RB of NPF, OCC index 2 may be applied to all MPFs coexisting (or overlapping) with the corresponding RB.

Also, multiplexing may be performed between NPFs or between MPFs through different DMRS CS values.

Table 13 illustrates an example of a case where NPF and MPF use different DMRS OCC indices and different DMRS CSs.

TABLE 13

| OCC index of data region | OCC index of DMRS region | CS value of DMRS region | PUCCH resource |
|---|---|---|---|
| 1 | 1 | 0 | NPF1 |
| 2 | 1 | 6 | NPF2 |
| 3 | 2 | 0 | MPF1 |
| 4 | 2 | 4 | MPF2 |
| 5 | 2 | 8 | MPF3 |

As discussed above, when the DMRS CS value corresponding to a PUCCH resource is N in all the methods for distinguishing between multi-RB PUCCH formats sharing k number of RBs, offset of (N+a) mod CS_max may be configured/applied in a given form.

Here, a meaning of the value "a" may be interpreted as giving an offset by "a" when a DMRS CS value corresponding to a PUCCH resource is determined. For example, CS max may be 12 and "a" may be a positive integer.

Also, in cases where DMRS CS values regarding two PUCCH resources are 0 and 6, modified forms of (0+a) mod 12 and (6+a) mod 12 may be configured/applied, respectively, (in a state in which an interval between PUCCH resources is maintained as is).

Here, A modular (mod) B means a remainder value obtained by dividing A by B.

Device to which Present Invention is Applicable

FIG. 19 is a block diagram of a wireless communication device to which methods proposed in this disclosure can be applied.

Referring to FIG. 19, a wireless communication system includes an eNB 1910 and a plurality of UEs 1920 positioned within coverage of the BS 1910.

The eNB 1910 includes a processor 1911, a memory 1912, and a radio frequency (RF) unit 1913. The processor 1911 implements the functions, processes, and/or methods proposed in FIGS. 1 to 17. Layers of a radio interface protocol may be implemented by the processor 1911. The memory 1912 is connected to the processor 1911 and stores various types of information for driving the processor 1911. The RF unit 1913 is connected to the processor 1911 and transmits and/or receives a radio signal.

The UE 1920 includes a processor 1921, a memory 1922, and an RF unit 1923. The processor 1921 implements the functions, processes, and/or methods proposed in FIGS. 1 to 18. Layers of a radio interface protocol may be implemented by the processor 1921. The memory 1922 is connected to the processor 1921 and stores various types of information for driving the processor 1921. The RF unit 1923 is connected to the processor 1921 and transmits and/or receives a radio signal.

The memories 1912 and 1922 may be present within or outside the processors 1911 and 1921 and connected to the processors 1911 and 1921 through various well known units, respectively.

Also, the eNB 1910 and/or the UE 1920 may have a single antenna or multiple antennas.

The above-described embodiments are results in which the elements and characteristics of the present invention are combined in a specific form. Each of the element or characteristics has to be considered as being optional unless otherwise explicitly described.

Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

The method of allocating resource in a wireless communication system of the present invention has been described on the basis of an example applied to a 3GPP LTE/LTE-A system, but the method of allocating resource may also be applied to various other wireless communication systems, as well as to the 3GPP LTE/LTE-A system.

What is claimed is:

1. A method of transmitting, by a user equipment (UE), uplink control information (UCI) in a wireless communication system, the method comprising:
   receiving, from a base station (BS), physical uplink control channel (PUCCH) resource information for the UCI,
   wherein the UCI is hybrid automatic repeat request (HARQ) feedback information of multiple downlink cells; and
   transmitting, to the BS, the UCI on a PUCCH resource,
   wherein the PUCCH resource is mapped to multiple resource block (RB) pairs,
   wherein the multiple RB pairs include RBs included in a first slot and RBs included in a second slot,
   wherein the RBs included in the first slot are consecutive RBs to each other, and the RBs included in the second slot are consecutive RBs to each other, and
   wherein a long demodulation reference signal (DMRS) is generated for the entirety of the multiple RB pairs, or the entirety of specific RB pairs.

2. The method of claim 1, wherein the HARQ feedback information includes a HARQ feedback for each cell of the multiple downlink cells.

3. The method of claim 1, wherein the same orthogonal cover code (OCC) index is used in each of the multiple RB pairs.

4. The method of claim 1, wherein
   the multiple downlink cells include multiple cell groups (CGs), and
   Reed-Muller (RM) coding is separately performed on UCIs by cell groups or is collectively performed on the entire cell groups.

5. The method of claim 4, wherein when the UCIs are separately coded by cell groups, single RM coding or dual RM coding is performed depending on the number of bits of the UCIs divided by cell groups.

6. The method of claim 5, wherein when the UCIs are separately RM-coded and output by cell groups, RM interleaving is not performed on coded bits of the output UCIs.

7. The method of claim 4, wherein when there is no scheduling of UCI transmission regarding a specific cell group among the multiple cell groups, UCI transmission regarding the specific cell group without scheduling is dropped.

8. The method of claim 4, wherein when single coding is performed on the entire UCIs, the UCIs are divided to correspond to a number of PUCCH resources allocated to the UE.

9. The method of claim 8, wherein single RM coding or dual RM coding is performed on each of the divided UCIs in consideration of the number of bits of each of the divided UCIs.

10. The method of claim 9, wherein RM interleaving is performed on coded bits of each UCI output through the RM coding.

11. A method of receiving, by a base station (BS), uplink control information (UCI) in a wireless communication system, the method comprising:
    transmitting, to a user equipment (UE), physical uplink control channel (PUCCH) resource information for the UCI,
    wherein the UCI is hybrid automatic repeat request (HARQ) feedback information of multiple downlink cells; and
    receiving, from the UE, the UCI on a PUCCH resource,
    wherein the PUCCH resource is mapped to multiple resource block (RB) pairs,
    wherein the multiple RB pairs include RBs included in a first slot and RBs included in a second slot,
    wherein the RBs included in the first slot are consecutive RBs to each other, and the RBs included in the second slot are consecutive RBs to each other, and
    wherein a long demodulation reference signal (DMRS) is generated for the entirety of the multiple RB pairs, or the entirety of specific RB pairs.

12. The method of claim 11, wherein the HARQ feedback information includes a HARQ feedback for each cell of the multiple downlink cells.

13. The method of claim 11, further comprising:
    transmitting, to the UE, control information related to determination of the PUCCH resource,
    wherein the control information includes at least one of candidate list information of the PUCCH resource or a specific field for a specific PUCCH resource for transmitting the UCI among candidates of the PUCCH resource.

14. The method of claim 13, wherein the specific field is set to be the same for every cell group.

15. The method of claim 11, further comprising:
    transmitting, to the UE, downlink control information (DCI) including a transmit power control (TPC) command of the PUCCH resource through a specific cell among the multiple downlink cells.

16. A user equipment (UE) configured to transmit uplink control information (UCI) in a wireless communication system, the UE comprising:
    at least one transceiver configured to transmit and receive a radio signal; and
    at least one processor functionally connected to the at least one transceiver,
    wherein the at least one processor is configured to:
    control the at least one transceiver to receive, from a base station (BS), physical uplink control channel (PUCCH) resource information for the UCI,
    wherein the UCI is hybrid automatic repeat request (HARQ) feedback information of multiple downlink cells; and control the at least one transceiver to transmit, to the BS, the UCI on a PUCCH resource, wherein the PUCCH resource is mapped to multiple resource block (RB) pairs, wherein the multiple RB pairs include RBs included in a first slot and RBs included in a second slot, wherein the RBs included in the first slot are consecutive RBs to each other, and the RBs included in the second slot are consecutive RBs to each other, and wherein a long demodulation reference signal (DMRS) is generated for the entirety of the multiple RB pairs, or the entirety of specific RB pairs.

17. The UE of claim 16, wherein the HARQ feedback information includes a HARQ feedback for each cell of the multiple downlink cells.

* * * * *